United States Patent [19]

Freeman

[11] 4,420,656
[45] Dec. 13, 1983

[54] INTERACTIVE TELEPHONE ANSWERING SYSTEM

[76] Inventor: Michael Freeman, 31 Cornwall La., Sands Point, N.Y. 11050

[21] Appl. No.: 295,817

[22] Filed: Aug. 24, 1981

Related U.S. Application Data

[63] Continuation-in-part of Ser. No. 97,687, Nov. 27, 1979, Pat. No. 4,320,256.

[51] Int. Cl.³ .................. H04M 1/64; H04M 3/00
[52] U.S. Cl. ........................... 179/6.04; 179/18 BE
[58] Field of Search ............... 179/6.04, 6.08, 18 BE; 434/309, 310, 314–316

[56] References Cited

U.S. PATENT DOCUMENTS

| | | | |
|---|---|---|---|
| 3,535,465 | 10/1970 | Smith | 179/6.04 X |
| 3,553,378 | 1/1971 | Alter et al. | 179/6.08 |
| 3,704,346 | 11/1972 | Smith et al. | 179/18 BE |
| 3,715,811 | 2/1973 | Thompson et al. | 434/310 |
| 3,733,717 | 5/1973 | Montgomery et al. | 434/315 |
| 3,804,993 | 4/1974 | Honnold et al. | 179/6.08 X |
| 3,854,013 | 12/1974 | Altenburger et al. | 179/18 BE |
| 3,925,622 | 12/1975 | Robinson | 179/18 BE |
| 3,996,671 | 12/1976 | Foster | 434/307 X |
| 4,005,530 | 2/1977 | Takahashi et al. | 434/315 |

Primary Examiner—Aristotelis M. Psitos
Attorney, Agent, or Firm—Hubbell, Cohen, Stiefel & Gross

[57] ABSTRACT

An interactive telephone answering system (20) connectable to a captured telephone line (26) is responsive to the detection (32, 34, 36, 38, 40, 42) of tones transmitted by the calling party from the keypad of a Touch-Tone phone for enabling caller selectable routing of an incoming call to a desired receiving phone (110) in accordance with a verbally interactive prerecorded decision tree format. The various selectable decision trees are prerecorded on a multitrack endless loop tape for playback (60, 62) of the channels selected (52, 54, 56, 58) by the calling party with the ultimate branches thereof each having a prerecorded arming signal which, when detected, activates the appropriate relay (50) to connect the caller to the desired telephone extension. The receiving party may also screen calls or have calls forwarded to another number by use of prerecorded codes on the tape. The decision tree format of the prerecorded messages is based on the recording of each channel in a specially created time sequenced manner enabling the user to provide tailored interactive answering of a telephone.

22 Claims, 14 Drawing Figures

LINE CAPTURE AND RELEASE

MOTOR CONTROL

TOUCH-TONE DECODER

FIG. 5. TRACK AND CHANNEL SELECTION (TYPICAL)

PLAYBACK AUDIO SYSTEM

RECORDING SYSTEM

CALL FORWARDING

CONCEPTUAL DECISION TREE
FOR EXAMPLE 1

CONCEPTUAL DECISION TREE
FOR EXAMPLE 2

CONCEPTUAL DECISION TREE
FOR EXAMPLE 3

INTERACTIVE TELEPHONE ANSWERING SYSTEM

CROSS-REFERENCE TO RELATED APPLICATIONS

This application is a continuation-in-part of my copending U.S. Patent Application Ser. No. 97,687, entitled "Improved Verbally Interactive Telephone Interrogation System", filed Nov. 27, 1979, now U.S. Pat. No. 4,320,256, and is related to my U.S. Pat. No. 3,947,972; 4,078,316; 4,264,924 and 4,264,925, the contents of all of which are specifically incorporated by reference herein in their entirety.

TECHNICAL FIELD

The present invention relates to a telephone answering system and particularly to such a system capable of providing caller-selectable routing of an incoming call in accordance with a verbally interactive prerecorded decision tree.

BACKGROUND ART

Touch-Tone Telephone Systems are well-known and extend throughout the United States. Such systems have been used for normal telephone conversations and as Data Sets but have not, to applicant's knowledge, achieved their full utilization as a communications interface, such as achieved by the present invention and the invention described and claimed in my copending U.S. Patent Application Ser. No. 97,687, filed Nov. 27, 1979 and entitled "Improved Verbally Interactive Telephone Interrogation System", in which the Touch-Tone type telephone is utilized to transmit unique signals over a captured telephone line to provide a verbally interactive telephone interrogation system, as in the aforementioned copending patent application, or to provide an interactive telephone answering system capable of caller selectable routing of an incoming call to a desired receiving telephone in accordance with a verbally interactive prerecorded decision tree format as in the present invention. Interrogation systems, or multiple choice selectible response systems are well known, such as exemplified by the prior art cited in the aforementioned copending patent application; namely U.S. Pat. Nos. 4,194,089; 3,947,972; 4,078,316; 3,950,618; 4,153,370; 3,651,471; 4,008,369; 4,216,497; 4,107,735; 3,906,450; 2,674,512; 3,744,712; 3,744,712; 3,776,453; 4,023,729; 3,974,335; 3,584,142; 3,654,708; 3,668,312; 3,729,581; 2,777,901; 3,194,895; 3,245,157; 3,273,260; 3,255,536; 3,284,923; 3,477,144; 3,484,950, 3,538,621; 3,546,791; 3,623,238; 3,665,615; 3,708,891; 3,763,577 and 3,774,316. The aforementioned systems also include broadcast audience poll systems such as disclosed in U.S. Pat. Nos. 2,674,512; 3,744,712; 3,776,453; 3,974,335; 4,023,729 and 3,950,618. Moreover, automatic telephone answering systems employing multitrack prerecorded messages in a fixed format are known, such as disclosed in U.S. Pat. No. 4,194,089, however such prior art systems are not truly interactive telephone answering systems capable of enabling caller selectable routing of an incoming call to a desired receiving telephone in accordance with a verbally interactive prerecorded decision tree format, merely providing for the recording of messages by the caller and the reception of prerecorded messages by that caller. Thus, none of the prior art systems known to applicant is a verbally interactive telephone answering system enabling caller selectable routing of an incoming call to a desired receiving telephone in accordance with a verbally interactive perecorded decision tree format, such as a system in which the caller may pass through a verbally interactive decision tree process before indicating which telephone extension the caller desires to be connected to, with this extension being automatically rung due to a prerecorded arming signal, or with the call being automatically forwarded due to prerecorded dialing codes located on the verbally interactive multitrack tape. In addition, although conventional telephone answering machines enable the owner to listen to the incoming message as it is being recorded, there are no such systems known to applicant which enable call screening in a variable decision tree format such as utilized in the present invention. Moreover, although two-way communication systems have become popular for purposes of polling or interrogation, such as the cable TV system known as QUBE, these prior art systems are not individualized verbally interactive systems nor do they enable caller selectable routing of incoming calls in accordance with a verbally interactive prerecorded decision tree format.

These disadvantages of the prior art are overcome by the present invention.

DISCLOSURE OF THE INVENTION

An interactive telephone answering system connectable to a capturable telephone line and responsive to unique signals transmitted over the telephone line after capture thereof, such as from a conventional Touch-Tone telephone, for enabling caller selectable routing of an incoming call to a desired receiving telephone in accordance with a verbally interactive pre-recorded decision tree format is provided. The system includes a line capture and release portion responsive to an incoming telephone call for initially capturing the telephone line and providing a message start signal to a multitrack message reproduction apparatus, such as one employing a continuous loop type cartridge, such as an endless loop cassette or an eight-track trap. The multitrack tape device is connectable to the line capture network for selectively transmitting prerecorded audio messages to the caller over the captured telephone line and is capable of providing a plurality of different selectable audio messages in a variable decision tree format, with at least one of the selectable tracks in the decision tree format comprising an arming signal, such as a ringing tone, associated with an ultimate branch of a caller selectable decision tree. Each of the caller selectable decision trees comprises a primary interrogatory audio message, such as one which is common to a plurality of different caller selectable decision trees having different ultimate branch responses, and a time related derivative ultimate branch response comprising the aforementioned arming signal. The ultimate branch response may be arrived at through a series of derivative secondary interrogatory messages comprising the various caller selectable decision trees with the derivative secondary interrogatory messages being chain linked in content to a particular primary interrogatory message or the previous derivative secondary interrogatory message for forming the caller selectable decision tree for ultimately directing the telephone caller to the ultimate branch on the selected decision tree.

The continuous loop type cartridge preferably comprises a plurality of coextensive audio tracks having the various audio messages and ultimate branch responses stored thereon for selectable audio playback therefrom over the captured telephone line for the audio messages and for provision of the arming signal when the ultimate branch response is obtained. Each of the plurality of tracks has a unique associated track selection signal corresponding to one of the unique signals transmitted over the captured telephone line. A signal discriminator and track selection network, such as one employing a tone decoder for converting the Touch-Tone signals into digital control signals, is operatively connected between the line capture network and the multitrack tape recorder for enabling reception of the unique signals or tones transmitted over the captured telephone line and selection of the appropriate one of the plurality of tracks for playback in response to reception and discrimination of the unique tone signal corresponding thereto.

A telephone connection network, such as one employing relays, is operatively connected between the line capture and release network and the multitrack tape recorder for connecting the captured telephone line to the receiving telephone is response to detection of the arming signal associated with the ultimate caller selectable branch. As such, the telephone connection network releases the captured telephone line from the multitrack tape recorder to the receiving telephone in response to detection of the arming signal with the captured telephone line then being released when the receiving telephone is placed on hook. Call-forwarding may be accomplished in the present invention by prerecording the dialing code of the number to which the call is to be forwarded as the ultimate branch response, with the caller providing a unique signal corresponding to a dial tone prior to the prerecorded dialing code being provided to a conventional call forwarding dialer. The telephone connection network may include a plurality of relays with one relay being associated with each track or possible telephone extension so that the caller may, either through the decision tree of prerecorded messages or by knowledge of the particular arming signal associated with a given telephone extension, be directly connected to the telephone extension of the desired receiving party. Thus, for example, if an eight-track tape were employed, eight relays could be employed for enabling selective connection of up to eight different telephone extensions, with the associated tone signal being decoded by the tone decoder so as to provide a digital control signal for arming the associated relay. The receiving party could, if desired, provide a secure system for receiving calls by changing the code for activating the relay or ringing generator to a different combination of tones required to provide the necessary digital control signal to ring forward to the desired extension or receiving telephone.

The owner of the telephone answering system can create interactive tone responsive telephone answering multitrack tapes on a multitrack continuous loop magnetic storage medium by recording each channel or track in a specially created timed-sequenced manner so as to make each information segment on each track coextensive and related in content, spatially in real time to the audio information segments recorded initially on the first recorded audio track in a decision tree format, with a ringing tone or arming signal being recorded at the end of each recorded audio message information segment for enabling ring tone generation upon selection of an ultimate branch in the decision tree. In addition, a call forwarding dialing code corresponding to a call forwarding telephone number could be recorded on one of the tracks in place of the ringing tone for enabling call forwarding to a remote telephone.

Thus, a caller responsive verbally interactive telephone call routing system may be provided in which the caller, through a verbally interactive prerecorded decision tree, may either be connected to a desired telephone extension within the internal telephone system of the receiving part or may have the call ultimately forwarded to a remote telephone. In addition, a receiving party may establish a secure telephone system so as to prescreen, in a verbally interactive environment, all incoming calls.

BEST MODE FOR CARRYING OUT THE INVENTION

Figure 1:
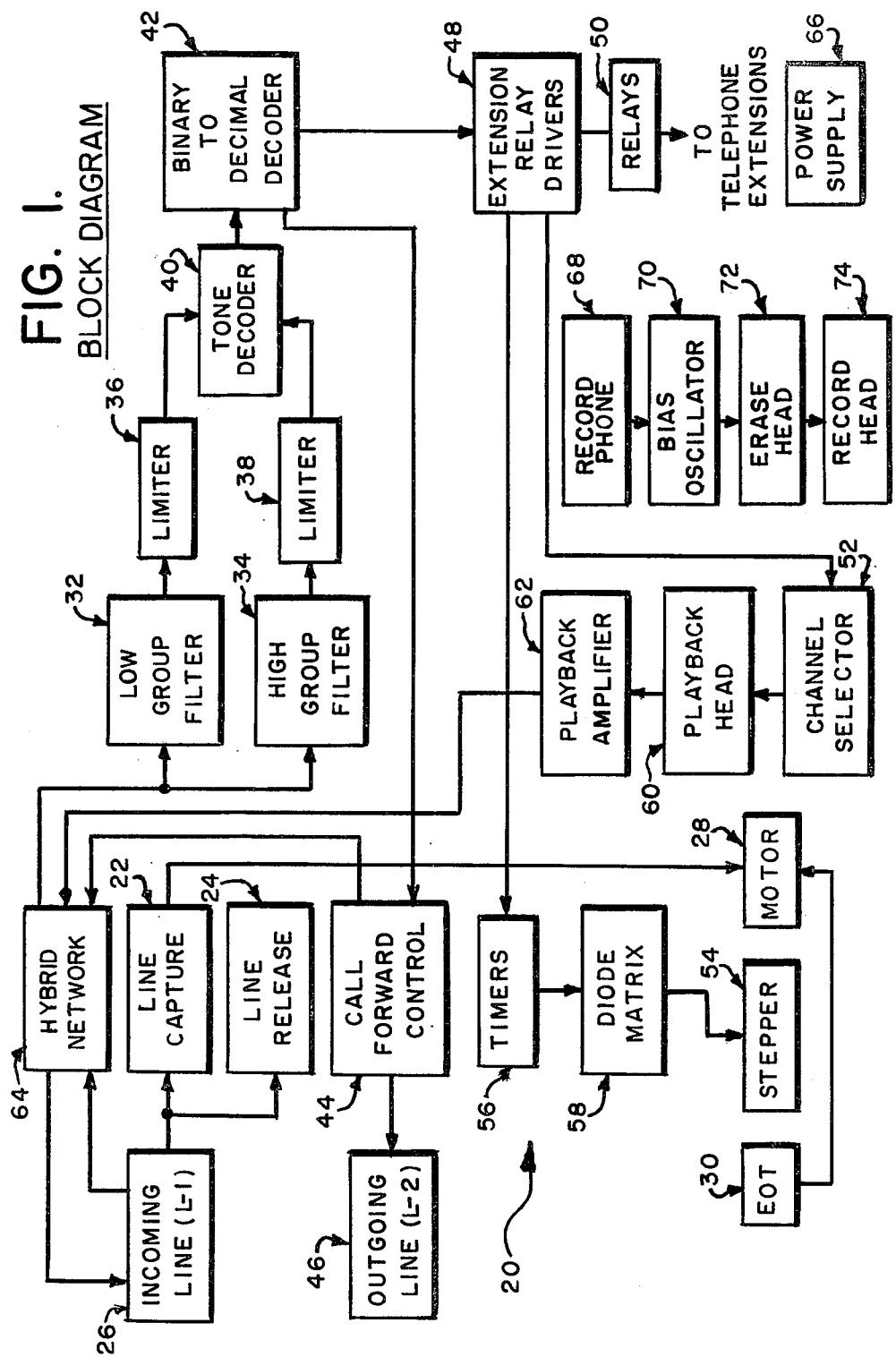
FIG. 1 is a functional block diagram of the presently preferred telephone answering system of the present invention.

Referring to the drawings in detail, and initially to FIG. 1 thereof, the presently preferred interactive telephone answering system of the present invention, generally referred to by the reference numeral 20, is shown. As shown and preferred in FIG. 1, telephone answering system 20 includes a line capture circuit 22 and a line release circuit 24 which are operatively connected to the incoming telephone line 26, as will be explained in greater detail hereinafter with reference to FIGS. 2 and 9. The preferred telephone answering system 20 also preferably includes a motor control circuit 28 which is connected to the line capture circuit 22 as well as to an end of tape sensing circuit 30, to be described in greater detail hereinafter with reference to FIGS. 3 and 9.

As also shown and preferred in FIG. 1, the telephone answering system 20 of the present invention also preferably includes Touch-Tone detection and decoding circuitry comprising a conventional low group frequency filter 32 and conventional high group frequency filter 34, each having respective conventional limiters 36 and 38 coupled to the outputs thereof, and a tone decoder 40 to be described in greater detail hereinafter with reference to FIG. 4, whose output is connected to a conventional binary to decimal decoder 42 for providing a digital control signal output in accordance with the decoded tone provided from tone decoder 40, to be described in greater detail hereinafter with reference to FIG. 4. The output of the binary-to-decimal decoder 42 may be provided to call forward control circuitry 44, to be described in greater detail hereinafter with reference to FIGS. 8 and 9 for control of the outgoing telephone line 46, or to extension relay driver circuitry 48, to be described in greater detail hereinafter with reference to FIGS. 5 and 9, which controls the activation of a relay network 50 to effect connection of the calling party to a desired receiving telephone, as will be described in greater detail hereinafter. The digital control signal output of the binary-to decimal decoder 42 also effects channel selection of the appropriate track in the decision tree via the channel selector circuitry 52 and the stepping circuitry 54 via timers 56 and a diode matrix 58. The audio playback circuitry of the system 20 of the present invention which is illustrated in greater detail in FIG. 6, is illustratively represented in FIG. 1 by playback head 60 and playback amplifier 62 connected to a hybrid network 64 whose output is connected to the incoming line 26. As shown and preferred in FIG. 1, the call forward control circuitry 44 and the low group and high group filters 32 and 34 are also connected to the hybrid network 64. In addition, the power supply 66 and the recording circuitry, represented by record phone circuit 68 bias oscillator 70, erase head 72 and record head 74 are illustratively represented in FIG. 1. As will be described in greater detail hereinafter, the track and channel selection function of the system of FIG. 1 will be described in greater detail with reference to FIG. 5 for selection of a typical channel, such as channel 1. With respect to the recording system, this shall be described in greater detail hereinafter with a reference to FIG. 7.

As will also be described in greater detail hereinafter, when an incoming call is received via the incoming line 26, this call is automatically answered by the line capture circuit 22 which, in addition to capturing the line, starts the motor 28 on the multitrack tape deck which is preferably, by way of example, an eight-track continuous loop type cartridge having the information stored thereon in information segments which are related in content and spactially in real time to each other such as described in my aforementioned copending U.S. Patent Application Ser. No. 97,687 which is incorporated by reference herein in its entirety. A prerecorded message is then presented to the calling party through the playback amplifier 62 and the hybrid network 64, with this message initially confirming that the calling party has reached a desired receiving party station, as will be described in greater detail hereinafter. The message would then instruct the calling party on how to proceed through the prerecorded decision tree so as to reach the desired receiving party or function at that station. The calling party proceeds through the decision tree in a verbally interactive environment by use of the appropriate Touch-Tone buttons on the calling party's telephone on command of the prerecorded messages provided from the tape. When the Touch-Tone button or key is depressed on the calling party's telephone, this unique tone signal is routed to filters 32 and 34 and, via limiters 36 and 38, to the tone decoder 40. The tone decoder 40 output is preferably converted to a decimal format in the binary-to-decimal decoder 42 to provide a digital control signal which selects the next appropriate tape channel and track and also, where appropriate, activates the receiving telephone extension to which the calling party wishes to be connected, as will be described in greater detail hereinafter. Thus, when the calling party has passed through the decision tree process and indicates which telephone extension is desired, that extension is activated and connected to the ringing generator in response to detection of a ringing tone or arming signal associated with the ultimate branch of the decision tree selected by the caller. When the chosen telephone extension comes off hook, the calling party would then be directly connected to the desired receiving party while simultaneously, the line capture circuit 22 would be de-energized to turn control of the captured telephone line over to the selected telephone extension. When this telephone extension phone is placed back on hook, the incoming line 26 would be disconnected and the system 20 would be ready for the next call. Preferably, after the connection is made to the desired telephone extension, the prerecorded message would be concluded and the end-of-tape sensor 30 would generate a signal which would turn off the motor 28.

Figure 2:
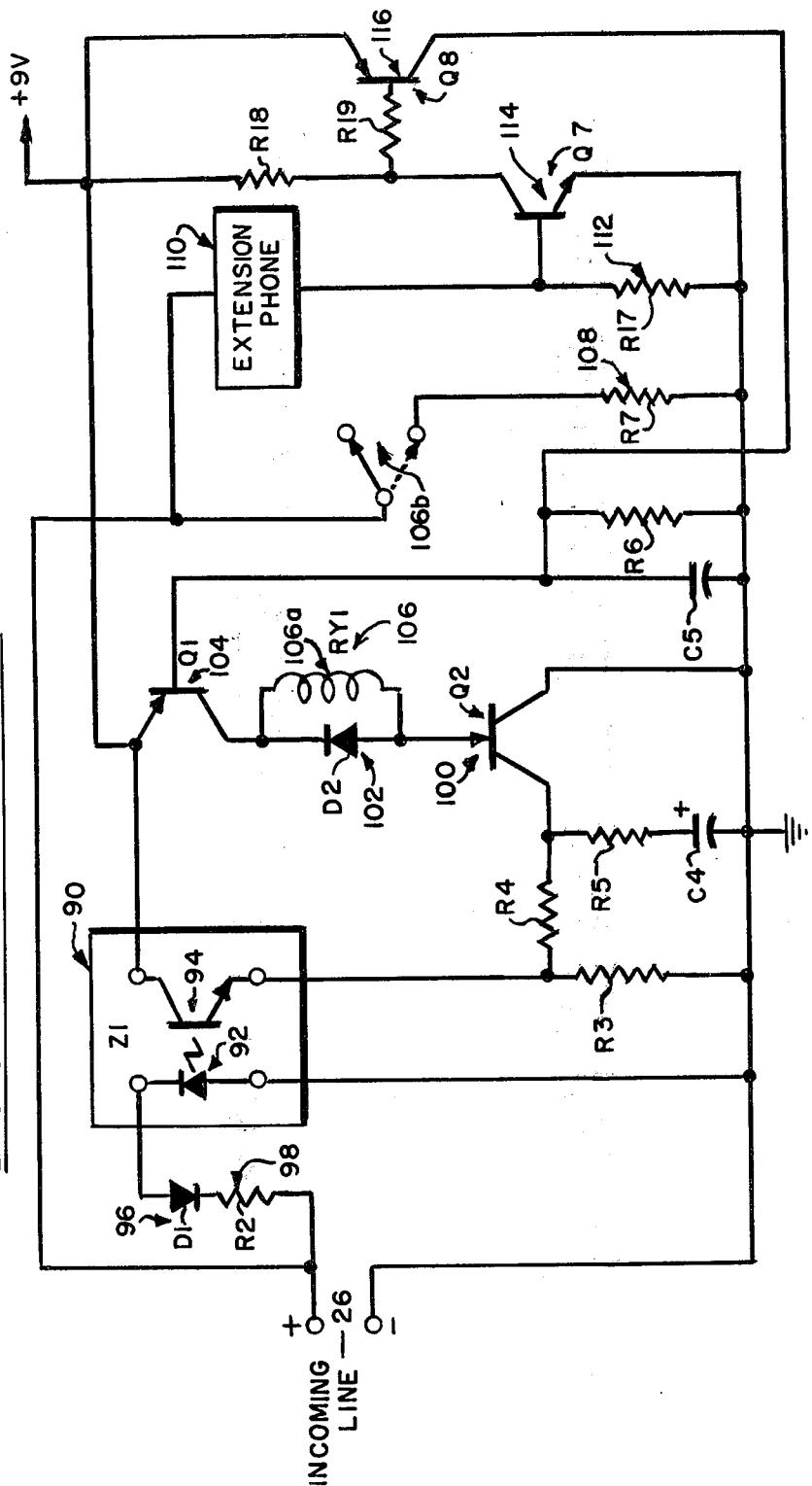
FIG. 2 is a schematic diagram of the line capture and release portions of the system of FIG. 1.

Now referring to FIG. 2, the line capture 22 and line release 24 circuitry of the system 20 of the present invention shall now be described in greater detail. As shown and preferred in FIG. 2, line capture is initiated by the ringing signal of an incoming call provided via the incoming line 26. The line capture and line release circuitry 22-24 preferably includes an optical coupler 90 which is fired when the first negative-going cycle of the ringing signal provided via the incoming line 26 exceeds a predetermined value, such as 75 volts by way of example. As shown and preferred in FIG. 2, the optical coupler 90 is conventional and includes a conventional LED or light emitting diode 92 optically coupled to a conventional photo-transistor 94. The light emitting diode 92 is coupled to the incoming line 26 by means of a diode 96 and a resistor 98 whose value is chosen such that light emitting diode 92 is fired when the aforementioned first negative-going cycle of the ringing signal exceeds the desired predetermined value, such as the aforementioned 75 volts by way of example. When the light emitting diode 92 is fired, the illumination from light emitting diode 92 places the photo-transistor 94 into the conducting state. This action preferably generates a positive pulse at the gate of an SCR 100 coupled to the collector of the photo-transistor 94 via a diode 102 and a transistor 104, with a conventional relay 106 having its coil 106a coupled across diode 102 and its switch contact 106b connected between the incoming line 26 and a resistire impedance 108. Thus, when SCR 100 is turned on, relay 106 is energized and switch 106b is placed in the dotted position illustrated in FIG. 2 thereby placing resistor 108 across the incoming line. This simulates an off-hook condition and causes capture of the line. If an extension phone 110 is subsequently answered, its circuit will be completed through another resistive impedance 112 to ground and transistors 114 and 116 will be turned on and the base of transistor 104 will be made positive. This will cause transistor 104 to turn off and SCR 100, relay 106 and resistive impedance 108 will be released, with switch 106b opening. This will place the extension telephone 110 in control of the captured telephone line. Thus, when the conversation is concluded and the extension telephone 110 is again placed on-hook, the incoming line 26 will automatically be released. The balance of the circuitry illustrated in FIG. 2 is conventional and will not be described in greater detail hereinafter.

Figure 3:
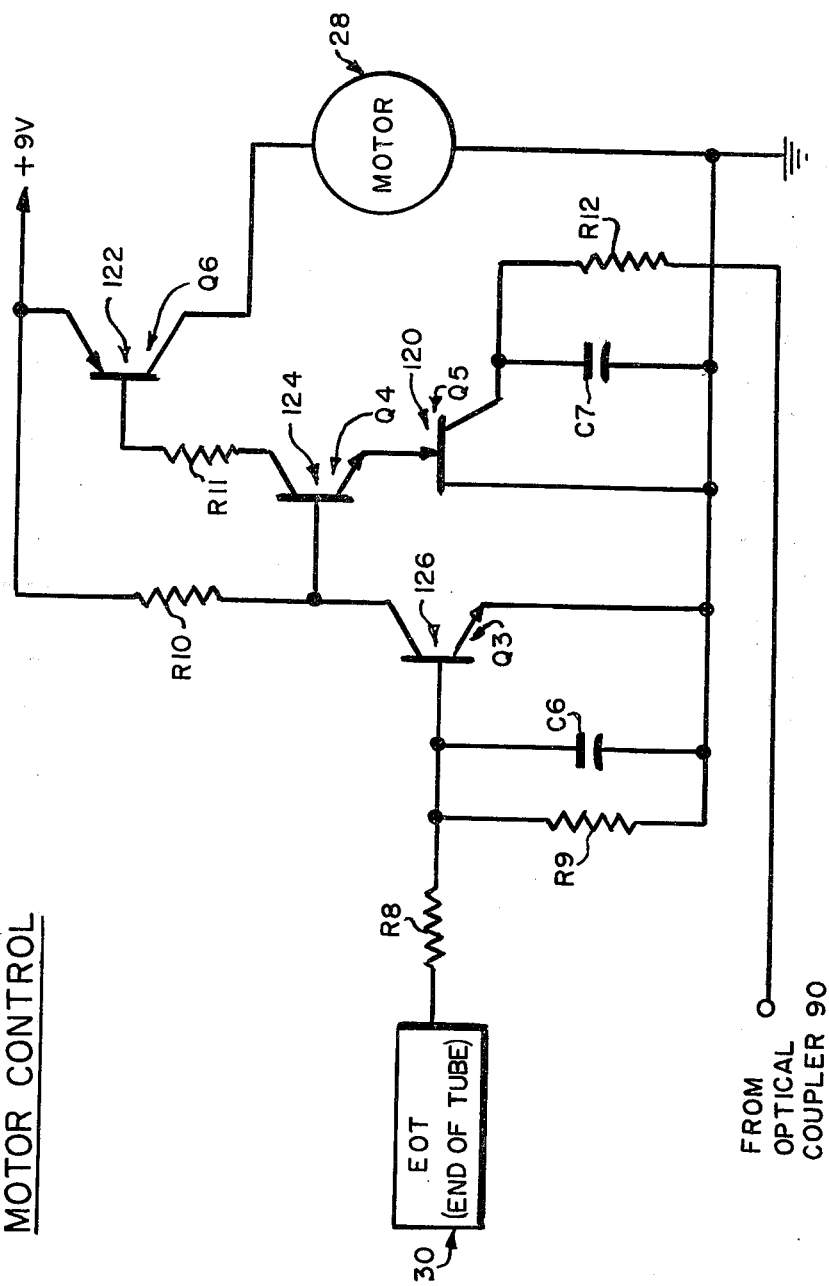
FIG. 3 is a schematic diagram of the motor control portion of the system of FIG. 1.

Referring now to FIG. 3, the motor control circuitry for controlling the operation of the motor 28 which controls the multitrack tape unit shall now be described in greater detail. As was previously mentioned, the ringing signal of an incoming call provided via the incoming line 26 preferably fires the optical coupler 90 in the line capture and release circuitry 22-24. This also generates a positive trigger pulse to the gate of an SCR 120 located in the motor 28 control circuit. When this SCR 120 is turned on, it provides a base drive current to a transistor 122 connected to the motor 28 through transistor 124 and voltage is applied to the tape driving motor 28. As will be described in greater detail hereinafter, preferably the prerecorded multitrack tape includes a conducting tab at the end of the prerecorded tape which when sensed, tab preferably causes a positive voltage to be applied to the base of another transistor 126 from the end-of-tape sensor 30 thereby turning on transistor 126. Preferably, simultaneously with this, transistors 122 and 124 and SCR 120 are turned off thereby removing the drive voltage from the tape driving motor 28. The balance of the circuitry illustrated in FIG. 3 is conventional and will not be described in greater detail hereinafter.

Figure 4:
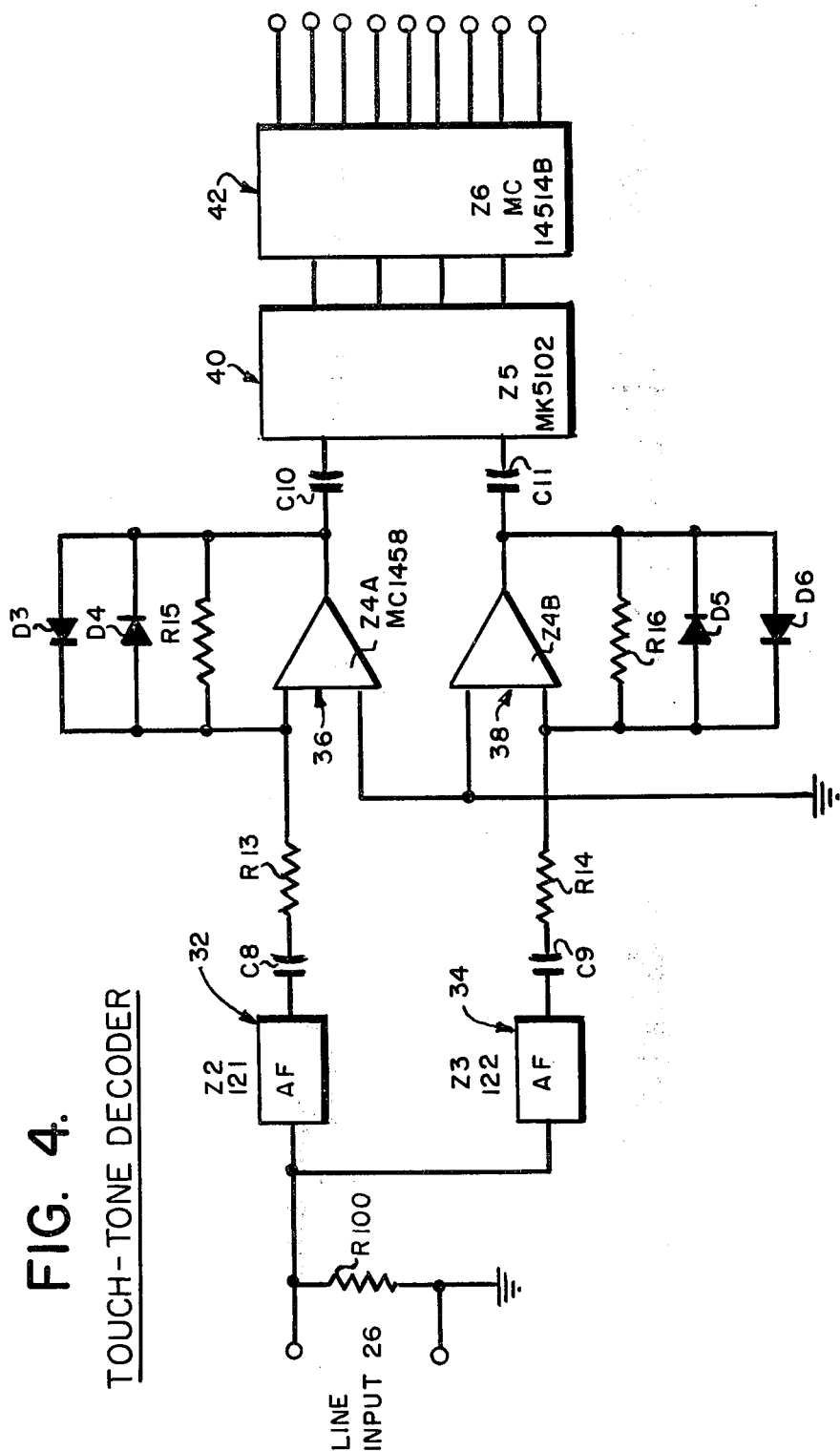
FIG. 4 is a schematic diagram of the tone decoder portion of the system of FIG. 1.

Referring now to FIG. 4, the tone detection circuitry which is employed in the system of FIG. 1 to generate the necessary digital control signals for operation of the various relays and track and channel selection in the system of FIG. 1 shall now be described in greater detail hereinafter. Assuming a conventional Touch-Tone telephone is employed in connection with the system 20 of FIG. 1, each Touch-Tone digit is composed of two discrete frequencies in accordance with the following conventional dialing matrix of Table 1.

TABLE 1

| Hz  | 1209 | 1336 | 1477 |
|-----|------|------|------|
| 697 | 1    | 2    | 3    |
| 770 | 4    | 5    | 6    |
| 852 | 7    | 8    | 9    |
| 941 | *    | 0    | #    |

Each digit in the above table generates one tone from the low frequency group which is conventionally termed the range of 697 to 941 Hertz, and one tone from the high frequency group which is generally termed the range of 1209 to 1477 Hertz. This composite signal is generated or transmitted by the calling party in the system 20 of the present invention in order to effect channel selection as well as telephone extension, as will be described in greater detail hereinafter. The transmitted tone signal provided via the captured telephone line 26 is preferably received by the low group filter 32 and the high group filter 34 which are preferably, by way of example, conventional sixth order elliptic band pass filters which provide a 40 dB separation between the high and low frequency groups. Further conventional conditioning of these received signals is preferably performed in limiters 36 and 38 which are conventional limiters which limit the signal levels, by way of example, to approximately 1.2 volts peak-to-peak. These limited signals are then preferably provided to a conventional Touch-Tone detector and decoder such as an MK 5102 Touch-Tone detector and decoder whose output is the binary equivalent of the number of the digit dialed in four-bit binary code. This binary output of decoder 40 is preferably converted to decimal format in the binary-to-decimal decoder 42, such as a conventional one-of-sixteen binary-to-decimal decoder, such as an MC 14514 B one-of-sixteen binary-to-decimal decoder. The balance of the circuitry illustrated in FIG. 4 is conventional and will not be described in greater detail hereinafter.

Figure 5:
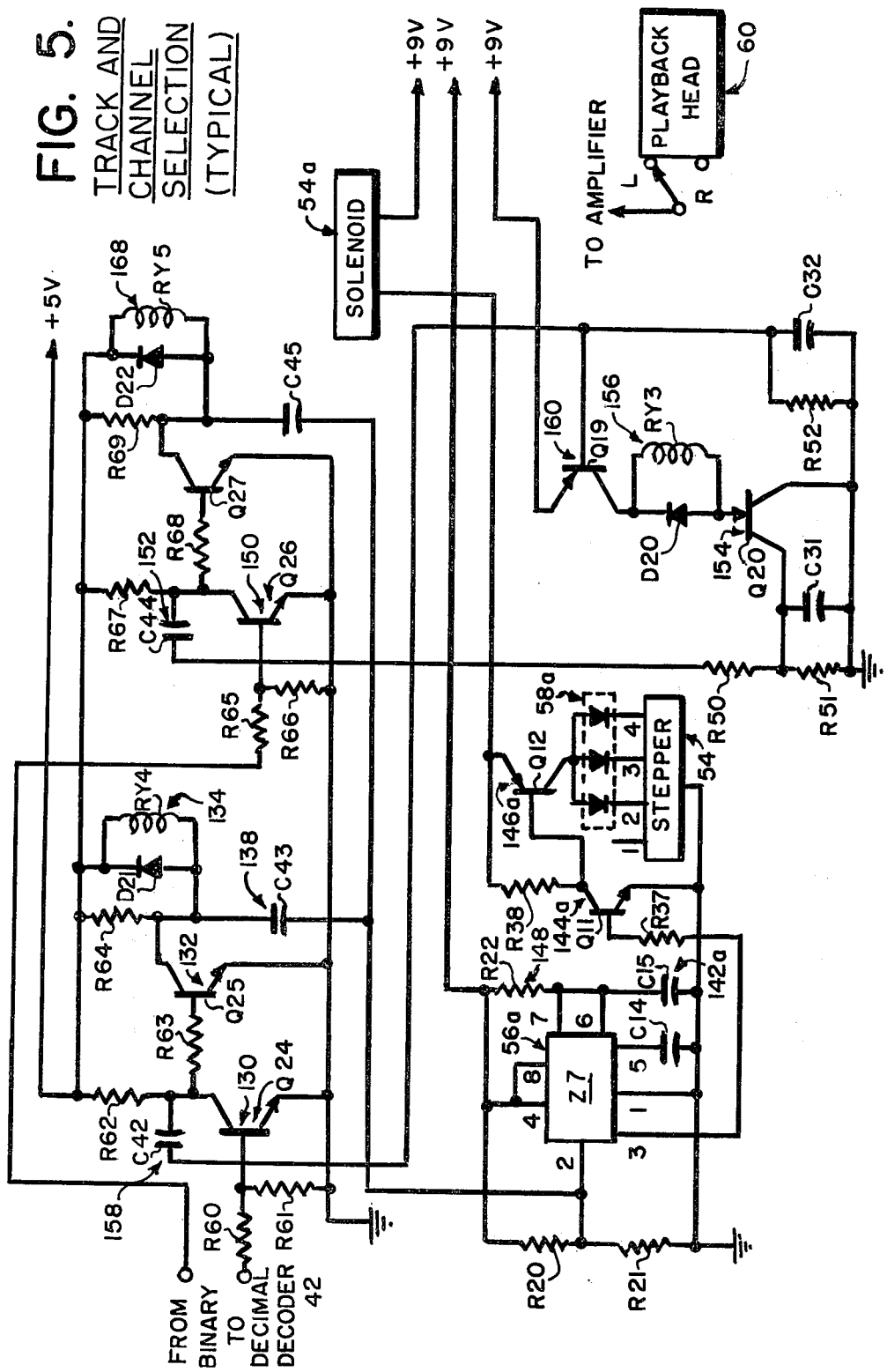
FIG. 5 is a schematic diagram of a typical track and channel selection portion of the system of FIG. 1 illustrating the circuit operation for selection of channel 1 by way of example.
Figure 6:
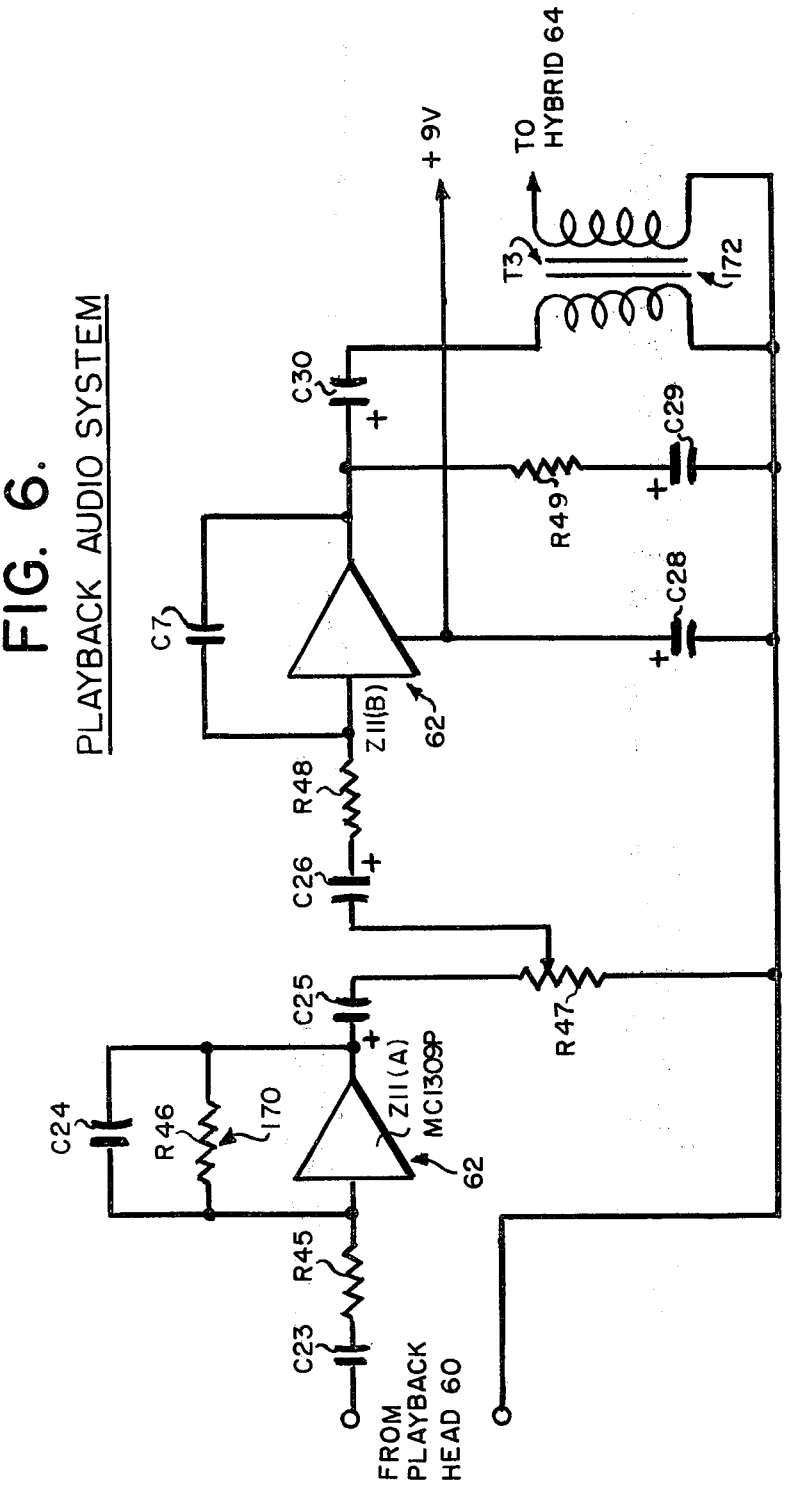
FIG. 6 is a schematic diagram of the playback audio portion of the system of FIG. 1.

Referring now to FIG. 5, the track and channel selection circuitry of the interactive telephone answering system 20 of the present invention shall now be described in greater detail with reference to a typical circuit operation for selection of channel 1, by way of example. The preferred actual overall circuitry is shown in detail in FIG. 9. With respect to track and channel selection, this is preferably controlled by digits 1 through 8 of the calling party Touch-Tone telephone. By way of example, in an eight track system, digits 1 and 2 could be employed to activate track 1, digits 3 and 4 could be employed to activate track 2, digits 5 and 6 could be employed to activate track 3 and digits 7 and 8 could be employed to activate track 4 with the odd-numbered digits activating the left channel playback head and the even number digits activating the right channel playback head. However, it should be noted that the system need not employ eight-tracks and an eight-track system is merely being described herein by way of example. As was previously mentioned, FIG. 5 illustrates a typical example of the circuit operation for selection of channel 1 in connection with the above example. It should be noted that the outputs of the binary-to-decimal decoder 42 are normally high prior to activation. If, in the present example, digit 1 is dialed or depressed on the calling party's Touch-Tone telephone, the output of binary-to-decimal decoder 42 corresponding thereto goes low which would turn transistor 130 coupled to the output of decoder 42 off. Since the collector of transistor 130 is coupled to the base of another transistor 132, transistor 132, will in turn, be turned on and provide a ground for a relay 134 coupled to the collector thereof which prepares extension 1 for connection. The tape deck stepper motor 54 then preferably conventionally selects the track to be employed since the stepper 54 is preferably a conventional ground-seeking system which continues to increment from channel to channel until it stops on a commutator segment which has no ground available. Thus, if channel 1 is desired, it is necessary to provide grounds on channels 2, 3 and 4 of a four channel system so that the head 60 will then stop in the proper position to playback the message on track 1. By way of example, this action occurs as follows. As the collector of transistor 132 goes to ground, a negative going pulse is preferably coupled to the trigger input of a conventional timer circuit 136, such as an MC 1455 timer, through a capacitor 138. The output of timer 136 is preferably normally low. Upon receipt of the negative trigger pulse, the output of timer 136 preferably goes high for a period of time which is determined by the time constant provided by the combination of a resistor 140 and a capacitor 142 connected thereto. This period is preferably set for approximately 30 seconds, by way of example, which is sufficient time for the stepper motor 54 to cycle through a maximum of 3 tracks in the above example. When the timer 56 output goes high, a pair of transistors 144 and 146 which are connected thereto are preferably turned on thereby providing a ground to commutator contacts 2, 3 and 4 of the stepper motor 54 through the diode matrix 58. The stepper solenoid 54a then preferably increments the playback head 60 to the proper position by means of a conventional ratchet-and-pawl mechanism (not shown).

Figure 9A:
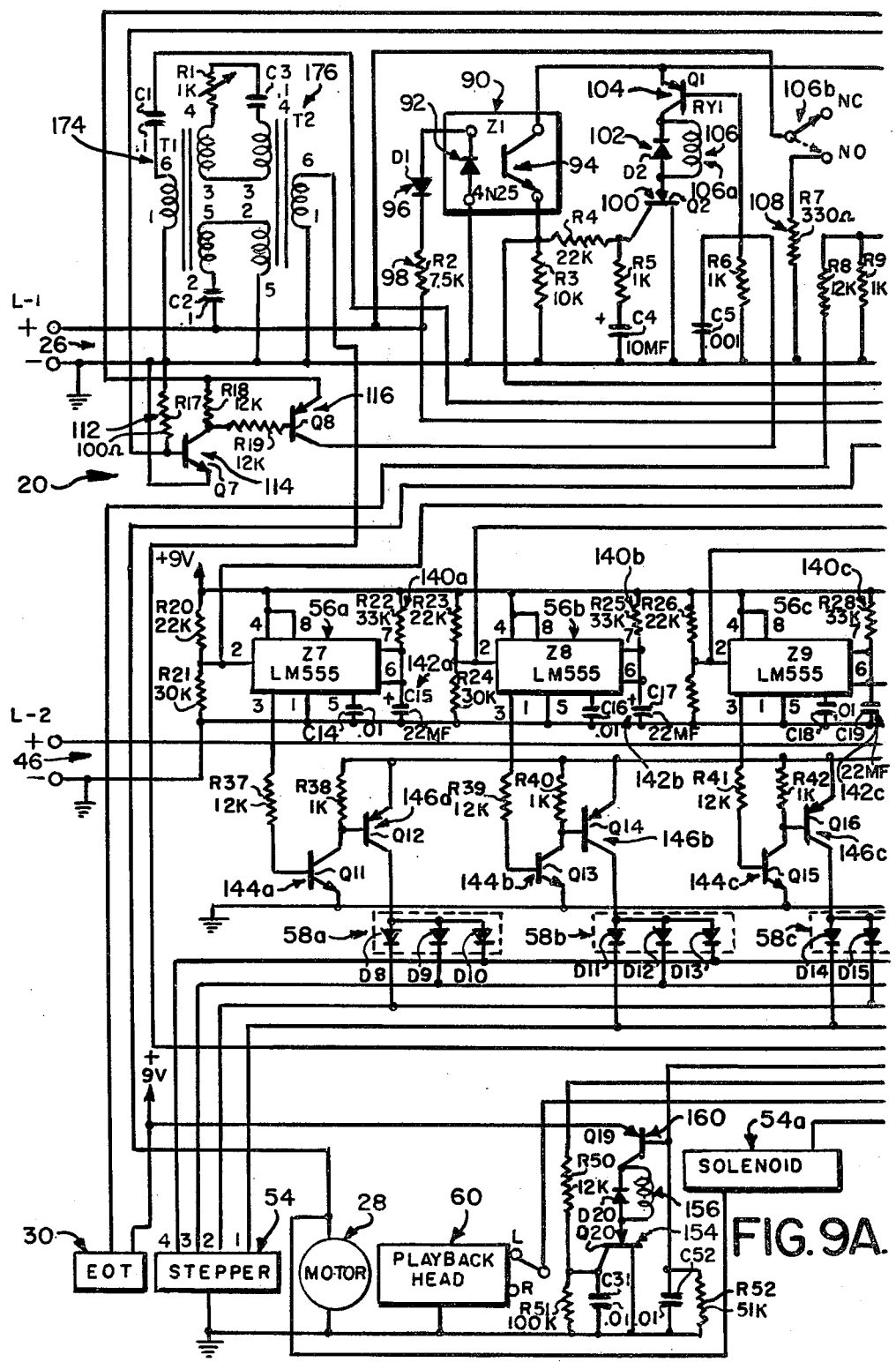
FIGS. 9A-9C are overall schematic diagrams of the system of FIG. 1.
Figure 9B:
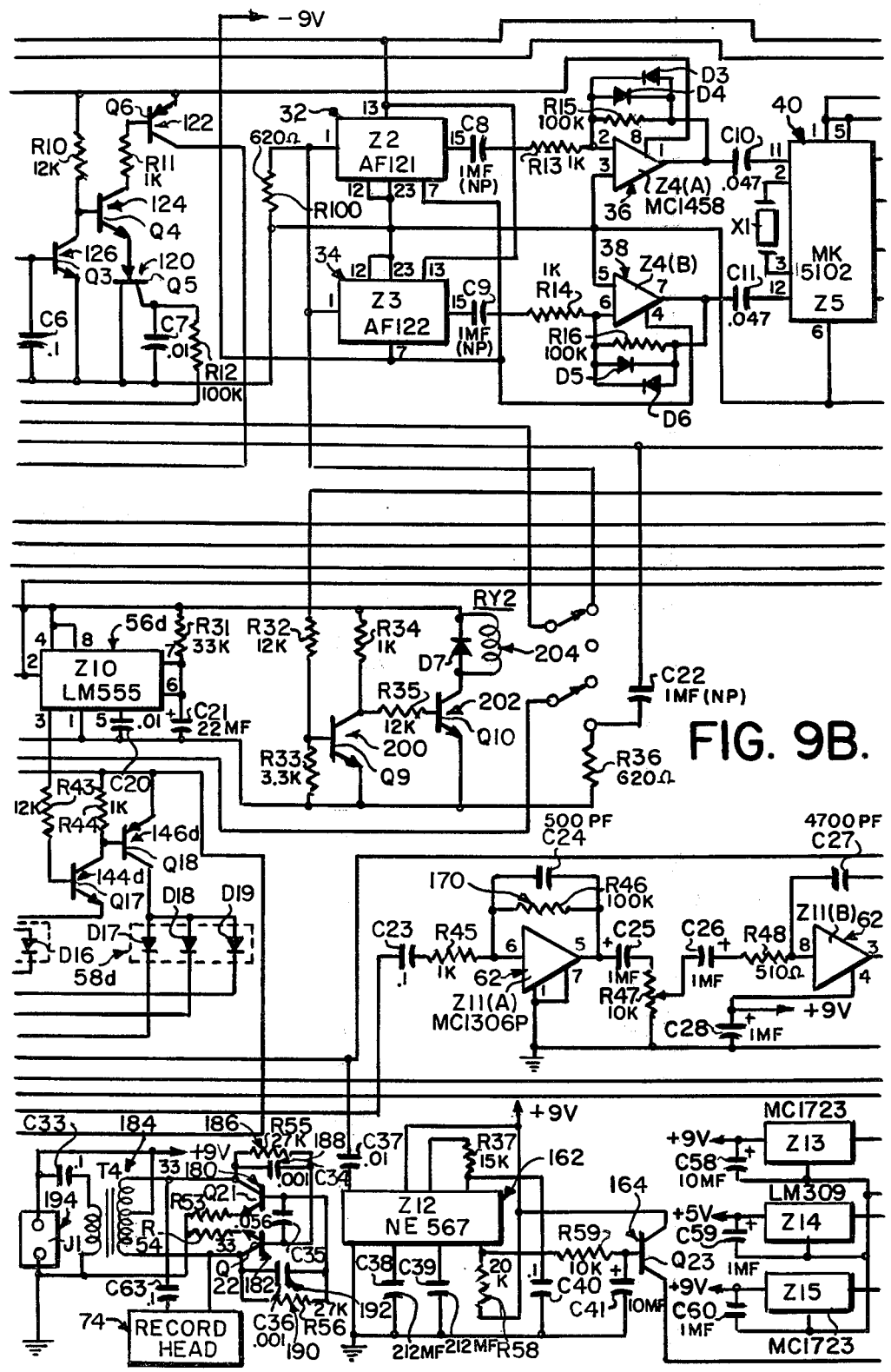
Figure 9C:
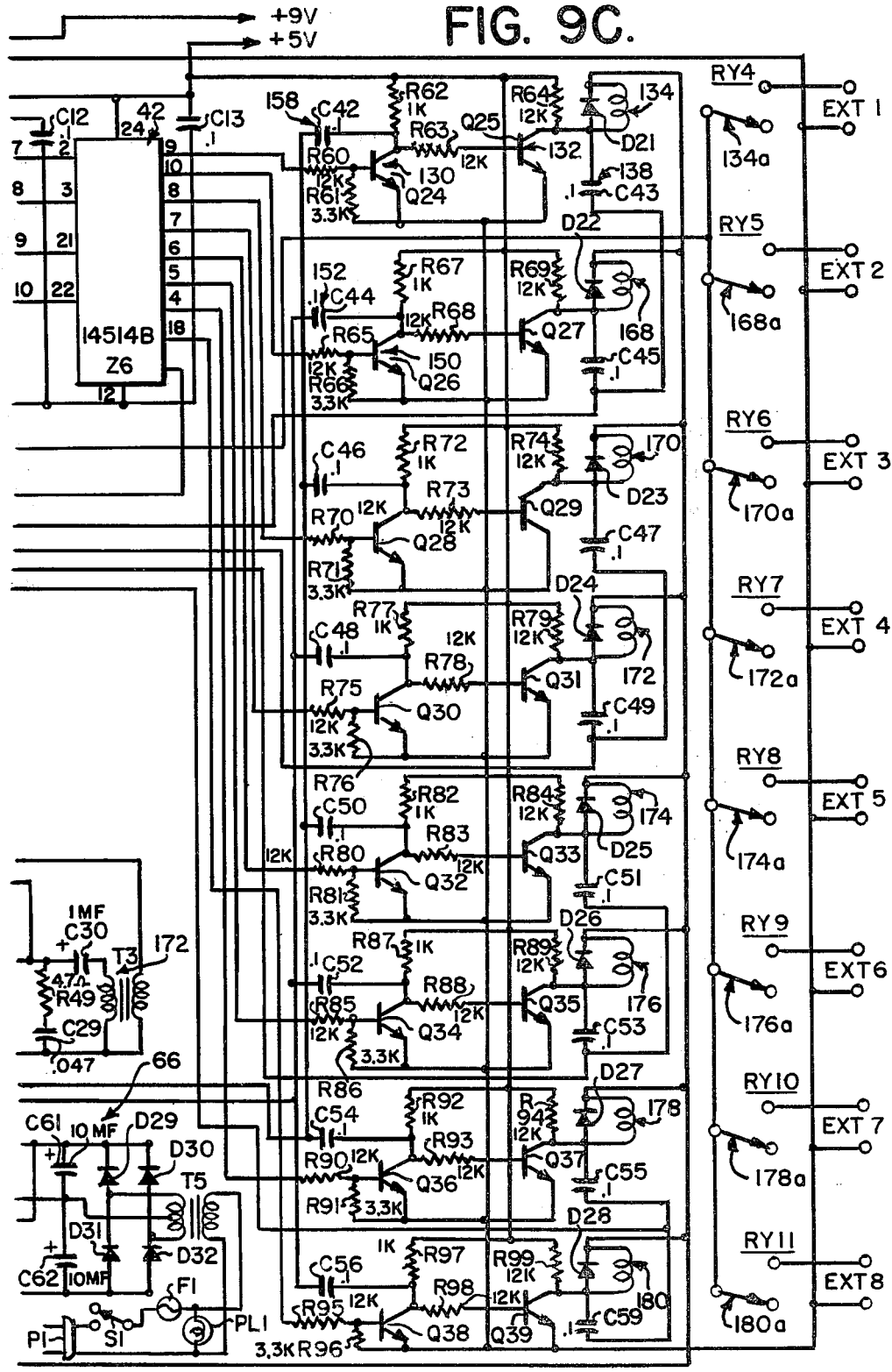

It should be noted that channel selection is preferably accomplished in the system 20 of the present invention as part of the track selection process. Thus, if in the above example, digit 2 is dialed or pushed on the calling party Touch-Tone telephone, then transistor 150 will be turned off. As the collector of transistor 150 goes high, a positive pulse is preferably coupled through a capacitor 152 to the gate of an SCR 154. A relay 156 is coupled to the SCR 154 and, when the SCR 154 is turned on the relay 156 is energized thereby activating the right channel playback head 60. If, instead, digit 1 is dialed or pushed on the calling party Touch-Tone telephone, then transistor 130 is turned off, and a positive going pulse is coupled through a capacitor 158 to the base of a transistor 160 which is then turned off, as is the SCR 154, thereby releasing the relay 156 which reverts the system 20 back to the left channel playback head 60. After the calling party has selected the desired extension or, as will be described in greater detail hereinafter, has reached the ultimate branch in the selected decision tree, the multitrack tape will play a prerecorded arming signal or tone which is preferably recognized by a conventional tone decoder 162 (FIG. 9) such as an NE 567 Tone Decoder. Upon receiving in-band tone, the output of decoder 162 goes low turning on a transistor 164 (FIG. 9) which energizes and connects the caller to the appropriate telephone extension relay, such as relay 166 for extension 1, relay 168 for extension 2, relay 170 for extension 3, relay 172 for extension 4, relay 174 for extension 5, relay 176 for extension 6, relay 178 for extension 7 or relay 180 for extension 8, by way of example, in the above eight-track example, with each of the aforementioned relays having an associated switch 166a, 168a, 170a, 172a, 174a, 176a, 178a and 180a, respectively (FIG. 9). The balance of the circuitry of FIG. 5 is conventional and will not be described in greater detail hereinafter.

Referring now to FIG. 6, a typical playback audio system circuit employable in the system 20 of the present invention is shown. Preferably, signals from the prerecorded multitrack tape are applied to the playback amplifier 62 which, by way of example, may be a conventional 250 milliwatt power amplifier such as an MC 1309 power amplifier, which includes gain control provided by a potentiometer 170. A conventional transformer 172, which is preferably coupled to the hybrid network 64, preferably provides impedance matching between the playback amplifier 62 output and the incoming line 26. The hybrid network 64 is preferably formed by a pair of transformers 174 and 176 (FIG. 9) which provide two-way communication on a two-wire line and preferably prevent any spurious signals on the tape from entering the input of the tone decoder 40 and causing erroneous channel and track changes. In addition, hybrid network 64 also preferably prevents the loading down of incoming signals by the low output impedance of the playback amplifier 62. The balance of the circuitry of FIG. 6 is conventional and will not be described in greater detail hereinafter.

Figure 7:
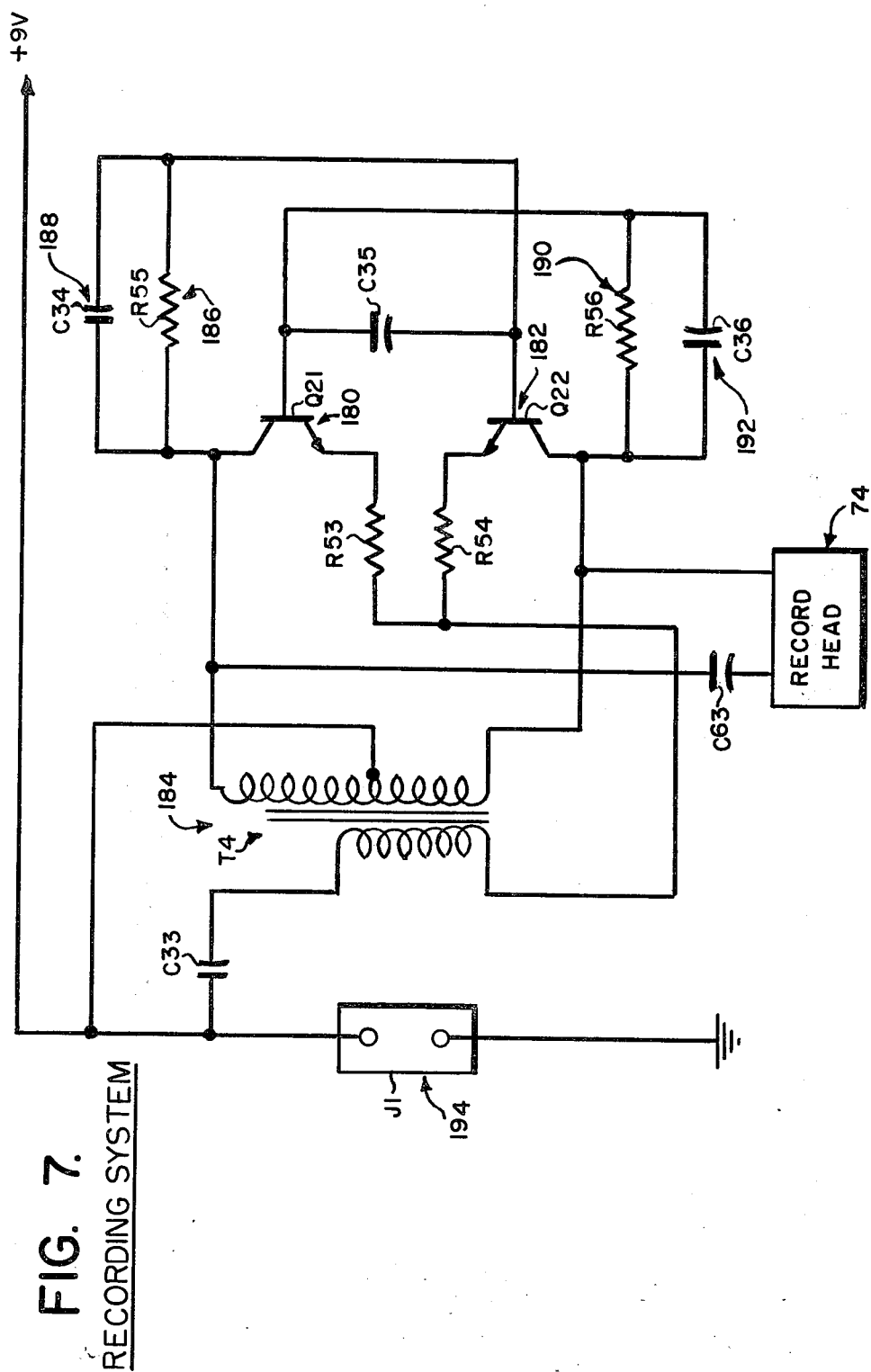
FIG. 7 is a schematic diagram of the recording portion of the system of FIG. 1.

Referring now to FIG. 7, a typical recording system employable in the interactive telephone answering system 20 of the present invention is shown. Thus, the system 20 of the present invention also preferably includes the ability to record messages on the endless loop multitrack tape. If distortion free tape recording is desired, then preferably the conventional high frequency bias oscillator 70 is employed during the recording process. This oscillator 70 also provides the erasure of any previously recorded signals on the tape. The conventional bias oscillator 70 in FIG. 7, is preferably composed of transistors 180 and 182 and transformer 184 and the various associated conventional components. The free running frequency of this oscillator 70 is preferably determined by a resistor 186, a capacitor 188, a resistor 190 and a capacitor 192. A conventional modular telephone jack 194 is preferably provided which accepts a standard telephone which may be used for the prerecording of tapes by the party possessing the telephone answering system 20 of the present invention, as will be described in greater detail hereinafter. The telephone and oscillator 70 are preferably powered by an internal power supply 66, with track and channel selection in the prerecording phase being accomplished by dialing of the appropriate Touch-Tone digits, as will be described in greater detail hereinafter. The telephone microphone is preferably employed in such an instance to record the desired message, with the audio signal modulating the bias oscillator 70 by injection into the primary of transformer 184. The balance of the circuitry of FIG. 7 is conventional and will not be described in greater detail hereinafter.

Figure 8:
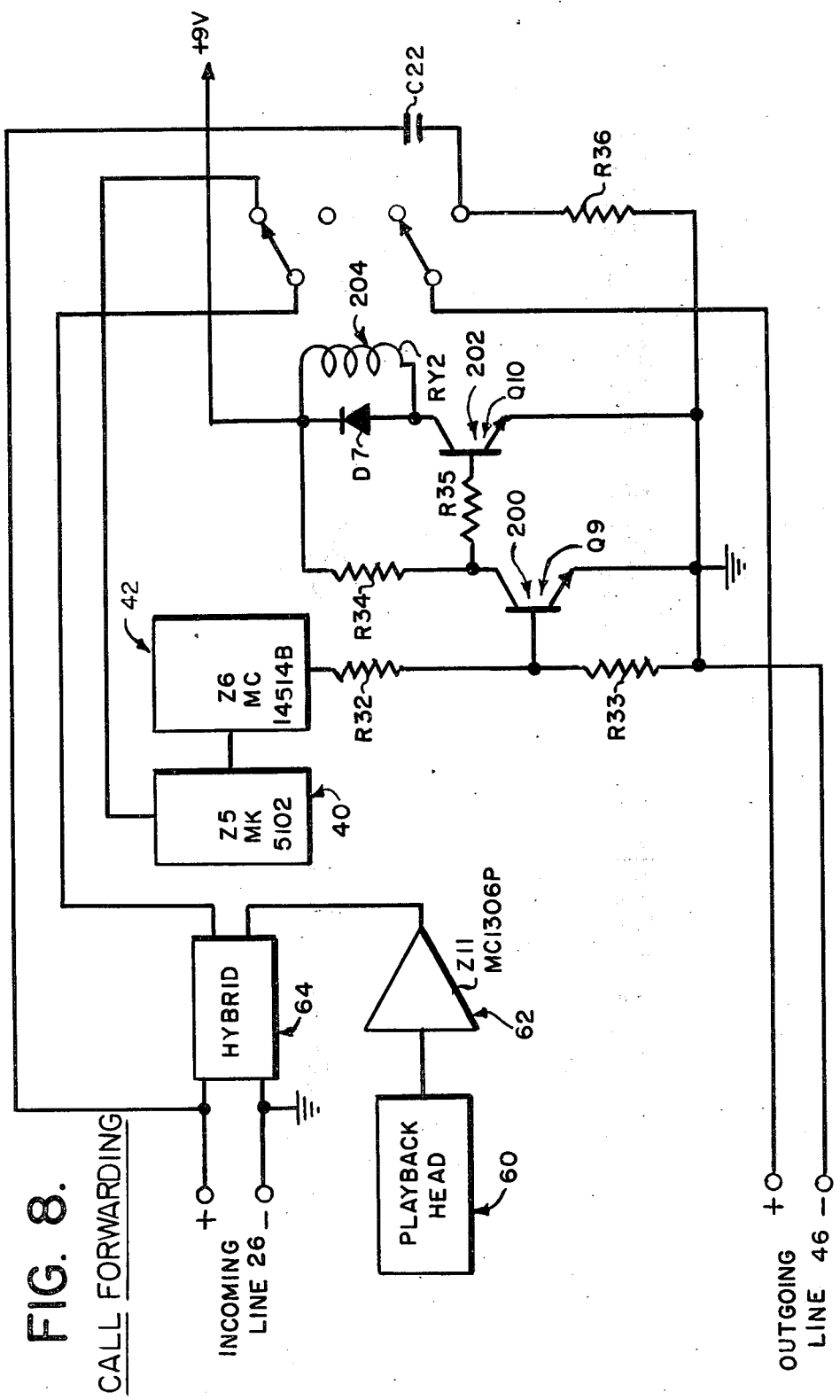
FIG. 8 is a schematic diagram of the call-forwarding control portion of the system of FIG. 1.

Referring now to FIG. 8, the call forward control circuitry 44 of the system 20 of the present invention shall now be described in greater detail. If desired, at the appropriate point in the prerecorded message on the multitrack tape, a calling party may have the incoming call forwarded to a different telephone number at which the ultimate receiving party is located. This is preferably accomplished by prerecording the Touch-Tone's signals or dialing code for the call-forward station on the tape. Prior to this point on the tape, the calling party would preferably be instructed to dial a particular code, such as the star digit on the calling party's Touch-Tone keypad. In such an instance, the output from the binary-to-decimal decoder 42 would be a positive going signal which would turn on a pair of transistors 200 and 202 (FIG. 9) thereby activating a relay 204. This relay 204 would then disconnect the incoming line 26 from the Touch-Tone decoder 40 so as to prevent the prerecorded call-forward dialing code or Touch-Tones signals on the tape from activating the the decoder 40. Relay 204 also preferably captures the outgoing line 46 and connects it to the incoming line 26. The prerecorded dialing code or Touch-Tone signals are then presented to the outgoing line 46 through the playback amplifier 62 and the call-forwarding number is automatically dialed. At the completion of the call, when both incoming and outgoing phones are placed on-hook, the system 20 is released and ready for the next call. The balance of the circuitry of FIG. 8 is conventional and will not be described in greater detail hereinafter.

With respect to the balance of the circuit in FIG. 9, which is an overall system 20 schematic, the balance of the circuitry other than previously described, is conventional and will not be described in greater detail hereinafter. Suffice it to say that exemplary conventional components, where practical, are illustrated in FIG. 9 and will be readily understood by one of ordinary skill in the art without further explanation.

With respect to the multitrack storage medium employable in the presently preferred system 20 of the present invention, as was previously mentioned, the tape medium is preferably a continuous loop type cartridge such as an endless loop cassette or, by way of example, an eight-track tape. However, as previously mentioned, the system 20 of the present invention can be employed using two channels, four channels, eight channels, cassette, reel-to-reel, or any other type of multitrack medium and may contain as many tracks as desired. In addition, multiple multitrack storage devices may be connected together to increase the capacity of the system, such as by staggering the starting time of a plurality of multitrack record/playback devices so as to, theoretically, handle an unlimited number of calls at the same time. For example, ten such devices having staggered starting times could enable each and every call to be answered by the next ready playback device with all tracks being combined with a multicaller phone line. In addition, remote retrieval of messages may preferably be obtained by the use of user created codes which are secure and changeable by the user and which would cause playback of the messages left by various calling parties on the tape. In such an instance, the person seeking to obtain the calling party's messages need not have a separate transmitter but could use the Touch-Tone keypad at a remote location to dial in the appropriate code.

With respect to the prerecorded multitrack tapes, as was previously mentioned, the decision tree format of these tapes is preferably substantially identical with that previously described in my copending U.S. patent application Ser. No. 97,687, of which this application is a continuation-in-part, and the contents of which are specifically incorporated by reference herein in their entirety. Thus, as fully explained in the aforementioned copending patent application, any of the tracks may contain questions or interrogatory information with any of the other tracks containing responsive messages related in real time and content to a particular interrogatory message on a different track. Moreover, one track may contain a primary interrogatory message which is common to a plurality of different decision trees. Thus, the information is preferably stored on each track in a plurality of reproducible information segments with each of the segments preferably comprising a complete message reproducible directly in response to selective playback of the track upon which the segments are being stored. At least one of the tracks at a given time contains stored information which comprises a primary interrogatory message or messages and associated multiple choice selectible responses, such as derivative secondary interrogatory containing messages related in content to a particular primary interrogatory message so as to provide the caller selectable decision trees. In addition, at least a plurality of the other tracks at any given time preferably comprise messages related in real time and content to the aforementioned primary interrogatory message, such as derivative secondary interrogatory messages, which correspond to the multiple choice selectible derivative secondary interrogatory containing messages so as to provide the various branches of the caller selectible decision trees, with each of the plurality of other tracks, in such an instance, preferably comprising a different derivative secondary interrogatory containing message. Under such circumstances, the plurality of other tracks further comprise associated multiple choice selectible responsive messages related in real time and content to each of the plurality of derivative secondary interrogatory containing messages with, preferably, by way of example, only one of the plurality of other tracks preferably comprising a unique selectible responsive message to the particular one of the real time related derivative secondary interrogatory messages which are preferably chain linked in content to a particular primary interrogatory message. Thus, preferably the stored primary and derivative secondary interrogatory messages contained on the multitrack storage medium and the associated stored responsive messages are spatially related to each other along the storage medium tracks in real time and further related in content to one another for providing a transitional derivative response or decision tree to the primary interrogatory message provided at a given time dependent on the track selected and the real time of selection, thereby providing an interactive conversational real time transitional environment. These multiple choice selectible different interrogatory messages may each comprise a different category of questions with each of the different categories of questions being associated with a different one of the plurality of other tracks and with the secondary derivative interrogatory messages corresponding to the different categories of questions, whereby a plurality of different interrogatories or decision trees may be simultaneously selectible. In such an instance, the associated responsive messages preferably comprise a common set of responsive messages for each of the different selectible secondary derivative interrogatory messages or decision trees. Each of the decision trees preferably has an ultimate branch and it is this ultimate branch which preferably has a prerecorded arming signal or tone at the completion of the ultimate branch message so as to connect the calling party to the desired extension obtained as a result of the decision tree process. Thus, as previously mentioned, when the calling party has passed through the decision tree process and indicated which extension is desired by selection of the ultimate branch, that extension would be activated and connected to the ringing generator (not shown) as a result of the detection of the arming tone or signal, and the captured telephone line would have the control thereof turned over from the multitrack storage device to the selected extension telephone.

The interactive telephone answering system 20 of the present invention may have many uses, such as in the commercial/industrial area as well as in the home consumer market. As will be described by way of example, in the commercial/industrial area, the telephone answering system 20 of the present invention can replace small switchboards, eliminate many of the current hold-/buzzer type commercial telephone systems and can make larger switchboards more efficient. In addition, through the use of a simple memory module, (not shown) the telephone answering system 20 can calculate on a daily basis the number of branch calls received and the utilization rates of specialized clerks and operators. With respect to the home consumer area, the telephone answering system 20 of the present invention can be employed to direct calls within a home automatically, screen calls, and forward calls automatically to another number once the calling party has met a set of conditions uniquely established by the receiving party. As will be described in examples below, the telephone answering system 20 of the present invention is preferably employed with a Touch-tone type of telephone system. However, the system may be conventionally modified, if desired, to enable employment with other types of telephone systems capable of generating unique signals correspoding to particular telephone digits.

EXAMPLE 1

In the first example, a calling party is verbally instructed to direct their own call through the use of the Touch-Tone button on their telephone. In this way, for example, a business of three to eight employees may replace a switchboard with the telephone answering system 20 of the present invention. For example, the following decision tree may occur:

PRERECORDED MESSAGE: You have reached the law firm of Jones, Block, Smith, and Williams. If you desire Mr. Jones Push 1, Mr. Block push 2, Mr. Smith push 3, or Mr. Williams push 4.

(Assume caller then pushes button No. 4 on his Touch-Tone phone)

PRERECORDED MESSAGE: Thank you, please hold on. We are ringing through to Mr. Williams' office for you.

It should be noted that the telephone answering system 20 of the present invention may, if desired, enable a calling party familiar with the code of the telephone extension desired to interrupt the tape message by immediately dialing in the required code for that extension and then pushing a key or keys corresponding to the arming tone or signal, such as the hatch (#) button on the telephone. This would automatically interrupt the tape message in the above example and route the call immediately to the desired receiving party, such as Mr. Williams.

EXAMPLE 2

Another example of the use of the telephone answering system 20 of the present invention is in the following decision tree.

PRERECORDED MESSAGE: Thank you for calling American Airlines. If you are calling about today's flights push 1, future flights push 2.

(Assume calling party then pushes 2)

PRERECORDED MESSAGE: Input noted. If you require information on domestic flights push 1, international push 2.

(Assume calling party then pushes 1)

PRERECORDED MESSAGE: Input noted. If you require arrival information push 1, departure information push 2.

(Assume calling party then pushes 2)

PRERECORDED MESSAGE: Thank you. An American Airlines representative specializing in domestic departures for future flights will be with you shortly.

EXAMPLE 3

Another examplary use of the telephone answering system 20 of the present invention is to screen unwanted calls in the home. In order to do this, the receiving party would give out a prerecorded security code to the callers that the receiving party wishes to be connected with. Under such circumstances, only people who have been given the security code to actually ring through to the residence will be able to accomplish this and all others must leave a message. Of course, the code can be changed easily and as frequently as desired. Thus, in this example, a prerecorded message such as the following may be provided:

"You have reached the Smith residence. No one is available to answer right now. At the sound of the tone please leave your name, number and message."

If Mr. Smith has given the calling party his security code, such as 1,5, the calling party could then push the Touch-Tone buttons 1 and 5 at any time during the above message and the security code would immediately cut off the recording and ring through to the Smith's telephone.

Another manner in which this screening of calls could be employed might be in connection with late night calls in which instance the device could be put on a night mode. Again, with the Smith household is called, a prerecorded message would be provided such as "You have reached the Smith residence. Everyone is asleep right now, but if you deem this call to be sufficiently important push 6 on your Touch-Tone phone."

When 6 was pushed, this would immediately cut off the recording and ring through to the Smith's phone. If desired, of course, this night mode situation could also be handled by a unique security code not provided in the prerecorded message so that only those callers who the receiving party wishes to have the capability of waking the receiving party up would posess this capability.

EXAMPLE 4

Another example of the use of the telephone answering system 20 of the present invention is in connection with screening calls for call forwarding. An example of this decision tree is as follows:

PRERECORDED MESSAGE: You have reached the office of Dr. Michael Freeman. If this call concerns a medical matter push 1, a non-medical matter push 2.

(Assume calling party then pushes 1.)

PRERECORDED MESSAGE: If you consider this a medical matter of importance push 3. If it can wait until tommorrow push 4.

(Assume calling party then pushes 3.)

PRERECORDED MESSAGE: Please hold on. Your call is being automatically forwarded to Dr. Freeman at another number.

Of course, in connection with the above example, if desired, a security code could be required to initiate the call forward sequence.

EXAMPLE 5

Another exemplary use of the system 20 of the present invention is to selectively screen calls within the home, such as in the following decision tree example:

PRERECORDED MESSAGE: You have reached the Barney residence. If this call is for our son Chuck, please push 1, all other calls please push 2.

If calling party then pushes 1, Chuck's phone rings.

If calling party then pushes 2, the downstairs house phone rings.

There are many, many more possible uses of the interactive telephone answering system 20 of the present invention which would readily occur to one of ordinary skill in the art, such as discriminating one message from another and giving the proper message to the proper calling party, such as for salesmen seeking to obtain specialized information from their office in an efficient and rapid manner, or for two people who communicated regularly such as an account representative and a repairman to leave messages for each other on particular reserved channels, or for a question and answer telephone recording machine in which the responses could be electronically scored in a simple memory, or many of the aforementioned capabilities could be combined such as screening, the requirement of a security code and then call forwarding. Thus, a dynamic multipurpose telephone answering system may be provided in accordance with the present invention.

Figure 10:
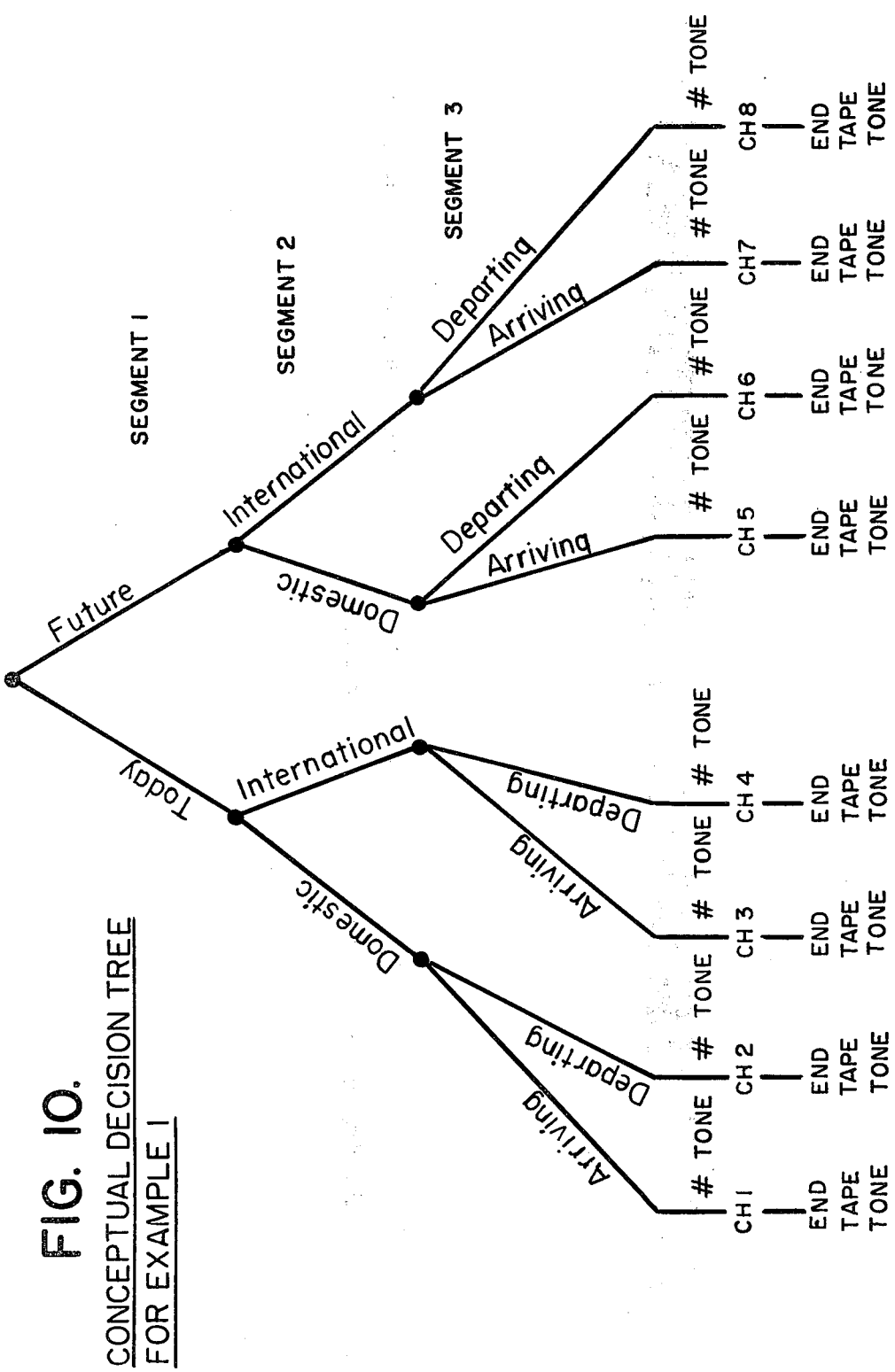
FIGS. 10 through 12 are diagrammatic illustrations of exemplary decision tree formats for use in connection with the system of FIG. 1.
Figure 11:
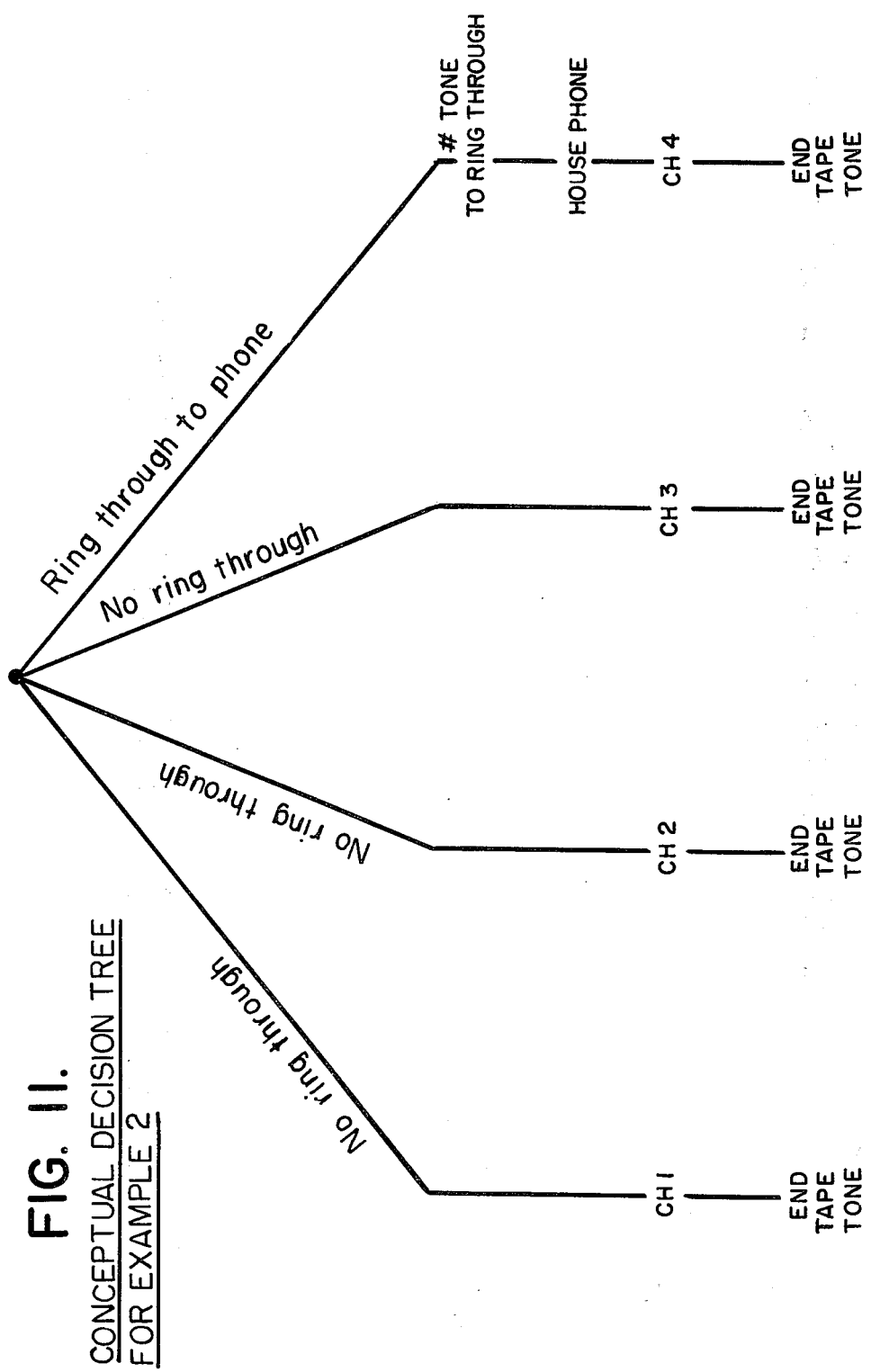
Figure 12:
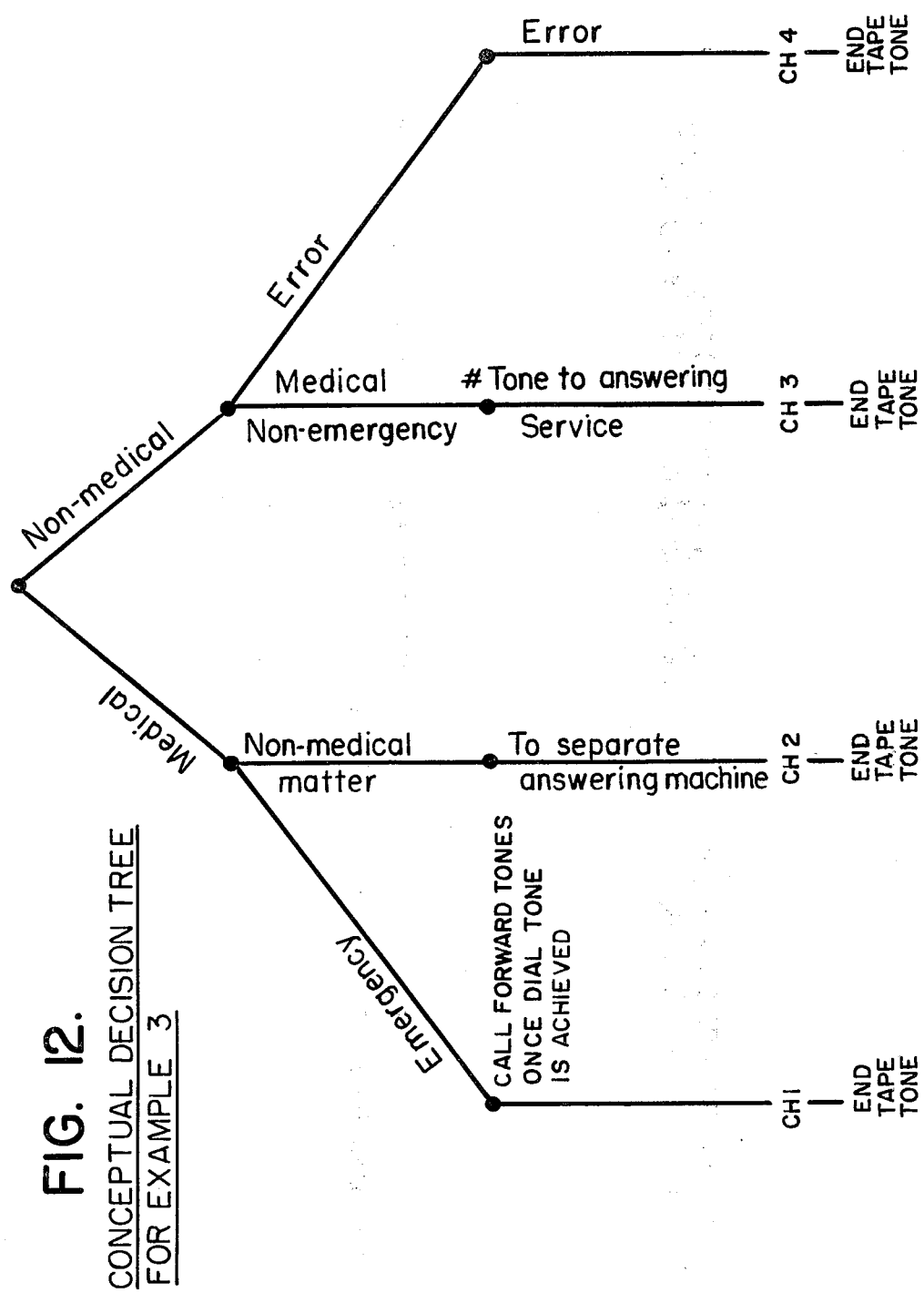

Of course, the tapes usably in the interactive telephone answering system 20 of the present invention may br prerecorded by the user so that the tapes may be specifically tailored to the user's needs and may contain special user assigned security codes as well as, of course, call forwarding numbers which may vary on a daily basis, for example. FIGS. 10, 11 and 12 illustrate three examples of typical conceptual decision trees which may be created by the user. Before describing these specific examples, the recording process which enabled the user to record each channel in a specially created time sequenced manner on a continuous loop type cartridge small generally be described. Thus, to begin programming the multitrack tape for use in the interactive telephone answering system 20 of the present invention, the user would pick up the Touch-Tone telephone which has preferably been connected to the input jack 194 of the recording system (FIG. 7) and would use the Touch-Tone telephone keypad to select each channel to be recorded. Pushing button number 1, for example, would bring the tape head 74 to channel number 1 which would then be ready for recording. If desired, of course, separate channel selector buttons could be incorporated into the telephone answering system 20 in place of the use of the user's Touch-Tone telephone key pad. Once the proper channel were selected, the record button would conventionally be pushed activating the record circuit and starting the multitrack tape in motion from its beginning position. It should be noted that, preferably the tape should always cycle to its beginning position and automatically stop which. With respect to endless loop cassettes, end tapes tones are used to accomplish this and with respect to eight-track tapes, metal strips are used to accomplish this. The user would then record the first channel and the various segments that go on this channel taking care to note the time required to record each separate segment. The user would then allow the tape to recycle to its beginning position and would then push button 2 to select channel 2. Channel 2 would then be recorded in the same manner with its various segments with extreme care being taken to allot the same exact time as alloted on channel 1 to each parallel or coextensive segment. For example, if segment 1 on channel 1 takes 10 seconds to record then segment 1 on channel 2 and all subsequent channels should also be 10 seconds in length so as to be coextensive. If segment 2 on channel 1 takes 15 seconds to record then segment 2 on channel 2 and all subsequent channels should also take up 15 seconds of recording time. The only exceptions are the last segment of a channel or if no further related branch is required; since no further branch decisions would take place after these two events the timing would not be crucial. Once all of the recorded verbal message segments are completed an arming tone or signal, such as the hatch (#) tone is recorded on all channels by depressing the corresponding code, such as the hatch button, on the Touch-Tone telephone. This tone, or some other unique assigned arming tone, would activate an external ringing generator to ring through to the phone, phones, or phone system associated with the ultimate branch or final channel selected by the user at the end of the caller selected decision tree. For example, if the user completes the branching program or decision tree on channel 6, then this tone according to the example of FIG. 10 would ring through to the group of phones corresponding to clerks specializing in future, domestic, departing flights for Universal Airlines. Since the hatch (#) tone in the above example is used to activate the ring generation system, a calling party who knew the branching program by heart could interrupt the taped message and push button 6 and then the hatch button to immediately ring through to the desired phone or group. This would eliminate the need to listen to the entire taped message if the caller knew the proper buttons to select. Once the connection were made between the calling party and the ultimate phone or group, a final end-of-tape tone, or a metal strip, would preferably appear to automatically stop the endless loop tape so it would be in a position to either record the next channel or answer the next call. In other words, the end-of-tape tone, or the metal strip, would preferably appear directly after the ring generation tone or arming tone since at this point the tape would no longer be required. It should be noted that once the connection is made to the receiving party, and the multitrack tape goes off line, the tape preferably recycles to the beginning of the tape and waits for the next incoming call.

Table 2 below corresponds to the example of FIG. 10 for prerecording a branching program using eight channels.

TABLE 2

| E-LAPSED TIME IN SECONDS | CHANNEL 1 | CHANNEL 2 | CHANNEL 3 | CHANNEL 4 | CHANNEL 5 | CHANNEL 6 | CHANNEL 7 | CHANNEL 8 |
|---|---|---|---|---|---|---|---|---|
| | SEGMENT 1 | | | | | | | |
| 1 | You have reached Universal Airlines If you desire information on today's flights push 1 on your touch tone phone, future flights push 2: | SAME AS CHANNEL NUMBER 1 | SAME AS CHANNEL NUMBER 1 | SAME AS CHANNEL NUMBER 1 | SAME AS CHANNEL NUMBER 1 | SAME AS CHANNEL NUMBER 1 | SAME AS CHANNEL NUMBER 1 | SAME AS CHANNEL NUMBER 1 |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | SEGMENT 2 | | | | | | | |
| 10 | Input confirmed TODAY'S FLIGHTS. If you are calling about domestic flights push 1, international flights push 2: | Input confirmed FUTURE FLIGHTS. If you are calling about domestic flights push 3, international flights push 4: | YOU HAVE MADE AN ERROR. PLEASE HANG UP AND DIAL AGAIN. | SAME AS CH 3 | SAME AS CH 3 | SAME AS CH 3 | SAME AS CH 3 | SAME AS CH 3 |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | SEGMENT 3 | | | | | | | |
| 19 | Input noted DOMESTIC FLIGHTS. If you are calling about arriving flights push 1, departing flights push 2. | Input noted INTERNATIONAL FLIGHTS. If you are calling about arriving flights push 3, departing flights push 4. | Input noted DOMESTIC FLIGHTS. If you are calling about arriving flights push 5, departing flights push 6. | Input noted INTERNATIONAL FLIGHTS. If you are calling about arriving flights push 7, departing flights push 8. | YOU HAVE MADE AN ERROR. PLEASE HANG UP AND DIAL AGAIN. | SAME AS CH 5 | SAME AS CH 5 | SAME AS CH 5 |
| 20 | | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |
| 27 | SEGMENT 4 | | | | | | | |
| 28 | Hold on, an operator specializing in TODAY's, DOMESTIC, ARRIVING FLIGHTS will be with you shortly. | Hold on, an operator specializing in TODAY's, DOMESTIC, DEPARTING FLIGHTS will be with you shortly. | Hold on, an operator specializing in TODAY'S, INTERNATIONAL, ARRIVING FLIGHTS will be with you shortly. | Hold on, an operator specializing in TODAY'S, INTERNATIONAL, DEPARTING FLIGHTS will be with you shortly. | Hold on, an operator specializing in FUTURE, DOMESTIC, ARRIVING FLIGHTS will be with you shortly. | Hold on, an operator specializing in FUTURE, DOMESTIC, DEPARTING FLIGHTS will be with you shortly. | Hold on, an operator specializing in FUTURE, INTERNATIONAL, ARRIVING FLIGHTS will be with you shortly. | Hold on, an operator specializing in FUTURE, INTERNATIONAL, DEPARTING FLIGHTS will be with you shortly. |
| 29 | | | | | | | | |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | "#" TONE | "#" TONE | "#" TONE | "#" TONE | "#" TONE | "#" TONE | "#" TONE | "#" TONE |
| 38 | | | | | | | | |
| 39 | | | | | | | | |
| 40 | TONE OR METAL STRIP TO STOP TAPE | TONE OR METAL STRIP TO STOP TAPE | TONE OR METAL STRIP TO STOP TAPE | TONE OR METAL STRIP TO STOP TAPE | TONE OR METAL STRIP TO STOP TAPE | TONE OR METAL STRIP TO STOP TAPE | TONE OR METAL STRIP TO STOP TAPE | TONE OR METAL STRIP TO STOP TAPE |
| 41 | | | | | | | | |
| 42 | | | | | | | | |

Table 3 below corresponds to FIG. 11 and illustrates a branching program employing four channels.

TABLE 3

| ELAPSED TIME IN SECONDS | CHANNEL 1 | CHANNEL 2 | CHANNEL 3 | CHANNEL 4 |
|---|---|---|---|---|
|  | SEGMENT 1 |  |  |  |
| 1 | You have reached | SAME AS CH 1 | SAME AS CH 1 | SAME AS CH 1 |
| 2 | the residence of |  |  |  |
| 3 | Michael Freeman. |  |  |  |
| 4 | Everyone is as- |  |  |  |
| 5 | leep right now |  |  |  |
| 6 | but if you feel |  |  |  |
| 7 | this call is suf- |  |  |  |
| 8 | ficiently impor- |  |  |  |
| 9 | tant, then push |  |  |  |
| 10 | number 4 on your |  |  |  |
| 11 | touch tone phone |  |  |  |
| 12 | SEGMENT 2 |  |  |  |
| 13 | Thank you for not | SAME AS CH 1 | SAME AS CH 1 | Hold on, we will |
| 14 | disturbing us. |  |  | ring through to |
| 15 | Please call back |  |  | the phone for |
| 16 | Tomorrow. |  |  | you. |
| 17 |  |  |  |  |
| 18 |  |  |  | "#" TONE |
| 19 | END TAPE TONE | END TAPE TONE | END TAPE TONE | END TAPE TONE |

Table 4 corresponds to FIG. 12 and illustrates another branching program using four channels and employs call forwarding. With respect to call forwarding pushing 9 or any other designated tone would be employed to bring the dial tone into the circuit prior to playback of the prerecorded dialing code corresponding to the call forward number.

TABLE 4

| ELAPSED TIME IN SECONDS | CHANNEL 1 | CHANNEL 2 | CHANNEL 3 | CHANNEL 4 |
|---|---|---|---|---|
|  | SEGMENT 1 |  |  |  |
| 1 | You have reached | SAME AS CH 1 | SAME AS CH 1 | SAME AS CH 1 |
| 2 | the office of Dr. |  |  |  |
| 3 | Marcus Welby. If |  |  |  |
| 4 | this call is a |  |  |  |
| 5 | medical matter |  |  |  |
| 6 | push 1, if not |  |  |  |
| 7 | push 2 |  |  |  |
|  | SEGMENT 2 |  |  |  |
| 8 | Thank you. If this | Non medical mat- | You have made an | SAME AS CH 3 |
| 9 | medical matter is | ters are being | error. Please |  |
| 10 | an emergency, push | handled by taped | hang up and dial |  |
| 11 | number 1 on your | message. At the | again. |  |
| 12 | touch tone phone. | sound of the tone |  |  |
| 13 | If not, please | leave you name |  |  |
| 14 | push number 3 | and message.** |  |  |
| 15 | SEGMENT 3 |  |  |  |
| 16 | Hold on, your call | TONE TO ACTIVATE | Hold on we are | You have made |
| 17 | will be automati- | SEPARATE TELE- | ringing through | an error. |
| 18 | cally call-for- | ANSWERING MACHINE | to the service | Please hang up |
| 19 | warded to Dr. Wel- |  | for you. | and dial again |
| 20 | by if you push # |  |  |  |
|  | 9 on your touch |  | "#" TONE |  |
|  | tone phone* |  |  |  |
|  | CALL-FORWARD TONES & END TAPE TONE | END OF TAPE TONE | END OF TAPE TONE | END OF TAPE TONE |

It is to be understood that the above described embodimens of the inventions are merely illustrative of the principles thereof and that numerous modifications and embodiments of the invention may be derived within the spirit and scope thereof.

What is claimed is:

1. An interactive telephone answering system connectable to a capturable telephone line and responsive to unique signals transmitted over said telephone line after capture thereof for enabling caller selectible routing of an incoming call to a desired receiving telephone in accordance with a verbally interactive prerecorded decision tree format, said system comprising line capture and release means responsive to an incoming telephone call for initially capturing said telephone line and providing a message start signal; multitrack message reproduction means connectable to said line capture means for selectively transmitting prerecorded audio messages to said caller over said captured telephone line, said multitrack message reproduction means comprising a multitrack magnetic storage medium for providing a plurality of different selectible audio messages in a variable decision tree format, at least one of said selectible tracks in said decision tree format comprising an arming signal associated with an ultimate branch of a caller selectible decision tree, each of said caller selectible decision trees comprising a primary interrogatory audio message and a time related derivative ultimate branch response comprising said arming signal, said storage medium comprising a plurality of coextensive tracks having said audio message and ultimate branch response stored thereon for selectible playback, therefrom, said coextensive tracks comprising audio tracks storing audio information thereon in a plurality of reproducible information segments, each of said segments comprising a complete message reproducible directly in response to selective playback of said track upon which said segments are stored, at least one of said tracks stored information comprising said primary interrogatory message and associated multiple choice selectible derivative secondary interrogatory containing messages related in content to said primary interrogatory message, at least a first plurality of said other tracks comprising derivative secondary interrogatory containing messages related in real time and content to said one track primary interrogatory message and corresponding to said associated multiple choice selectible derivative secondary interrogatory containing messages, each of said first plurality of said other tracks comprising a different derivative secondary interrogatory containing message, said first plurality of said other tracks further comprising associated multiple choice selectible responsive messages related in real time and content to each of said derivative secondary interrogatory containing messages, only one of said first plurality of said other tracks comprising a unique selectible responsive message to a particular one of said real time related derivative secondary interrogatory messages, said derivative secondary interrogatory messages being chain linked in content to said primary interrogatory message for forming said caller selectible decision tree for ultimately directing a telephone caller to said ultimate branch on said selected decision tree, said multitrack message reproduction means further comprising multitrack audio playback means for selectively transmitting said audio message from said storage medium over said captured telephone line, each of said plurality of tracks having a unique associated track selection signal corresponding to one of said unique signals transmitted over said captured telephone line; signal discriminator and track selection means operatively connected between said line capture means and said multitrack message reproduction means for enabling reception of said unique signals transmitted over said captured telephone line and selection of one of said plurality of tracks for selective playback thereof in response to reception and discrimination of the unique signal corresponding thereto; and telephone connection means operatively connected between said line capture and release means and said multitrack message reproduction means for connecting said telephone line to said receiving telephone in response to detection of said arming signal associated with said ultimate caller selectible branch, whereby a caller responsive verbally interactive telephone call routing system is provided.

2. A system in accordance with claim 1 wherein said signal discriminator and track selection means comprises means responsive to unique tone signals transmittable over said captured telephone line from a telephone tone signal generation means.

3. A system in accordance with claim 2 wherein said signal discriminator and track selection means comprising tone decoder means and means for connecting the output of said tone decoder into a digital control signal for enabling said track selection.

4. A system in accordance with claim 2 wherein, said telephone connection means further comprises relay means for releasing said captured telephone line from said multitrack message reproduction means to said receiving telephone in response to detection of a unique relay arming signal, said signal discriminator and track selection means comprising tone decoder means and means for converting the output of said tone decoder into a digital control signal from said unique signals, transmitted over said captured telephone line, a particular unique tone signal corresponding to said unique relay arming signal, whereby screenable selection of incoming calls may be provided for said receiving telephone.

5. A system in accordance with claim 1 wherein said telephone connection means comprises means for releasing said captured telephone line from said multitrack message reproduction means to said receiving telephone in response to detection of said arming signal for turning control of said capture telephone line over to said receiving telephone and for releasing said captured telephone line when said receiving telephone is placed on-hook.

6. A system in accordance with claim 1 wherein said stored primary and derivative secondary interrogatory messages and said associated responsive messages are spatially related to each other along said storage medium tracks in real time and further related in content to one another for providing a transitional derivative response to said primary interrogatory message dependent on the track selected and the real time of selection for providing a conversional real time transitional environment, said primary interrogatory message comprising a plurality of multiple choice selectible different interrogatory messages each comprising a different category of question, each of said different categories of questions being associated with a different one of said plurality of other tracks, said secondary derivative categories messages corresponding to said different categories of questions whereby a plurality of different interrogatories are simultaneously selectible, in a variable decision tree format, said associated responsive messages comprising a common set of responsive messages for each of said different selectible secondary derivative interrogatory messages, whereby said ultimate selectable decision tree branch is dependent upon the responses to said primary and secondary interrogatory messages comprising said selectable decision tree.

7. A system in accordance with claim 6 wherein said primary interrogatory message is common to a plurality of different caller selectible decision trees having different ultimate branch responses.

8. A system in accordance with claim 1 wherein said system further comprise response recording means for accumulating responses to particular interrogatory audio messages transmitted over said captured telephone line, said response recording means being operatively connected to said signal discriminator means, a unique signal transmitted over said captured telephone line being associated with a particular response to be accumulated, whereby a particular unique signal transmitted over said captured telephone line in response to a particular audio interogatory message transmitted from said multitrack message reproduction means over said captured telephone line will enable accumulatiion and classification of the responses to said particular interrogatory message.

9. A system in accordance with claim 1 wherein said multitrack magnetic storage medium comprises means for providing said primary interrogatory message as a common message to a plurality of different caller selectible decision trees having different ultimate branch responses.

10. A system in accordance with claim 1 wherein said multitrack message reproduction means comprises means responsive to said message start signal for initiating playbacks of said primary interrogatory message over said captured telephone line.

11. A system in accordance with claim 1 wherein said primary interrogatory message is common to a plurality of different caller selectible decision trees having different ultimate branch responses.

12. A system in accordance with claim 1 wherein said multitrack magnetic storage medium is capable of providing a selectible conversational responsive audio message to a particular primary reproducible interrogatory message from a plurality of different selectible audio messages stored thereon over said captured telephone line, said signal discriminator and track selection means discriminating said received unique signals transmitted over said captured telephone line, said selectively connected signal discriminator and track selection means selecting one of said plurality of audio tracks for playback by said playback means in response to reception and discrimination of the transmitted unique signal corresponding thereto, said information being stored on each of said tracks in a plurality of said reproducible information segments, said stored primary and derivative secondary interrogatory messages and said associated responsive messages being spatially related to each other along said storage medium tracks in real time and further related in content to one another for providing a transitional derivative response to said primary interrogatory message dependent on the track selected and the real time of selection for providing a conversational real time transitional environment, said primary interrogatory message comprising a plurality of multiple choice selectible different interrogatory messages each comprising a different category of question, each of said different categories of questions being associated with a different one of said plurality of other tracks, said secondary derivative categories messages corresponding to said different categories of questions whereby a plurality of different interrogatories are simultaneously selectible in a variable decision tree format, said associated responsive messages comprising a common set of responsive messages for each of said different selectible secondary derivative interrogatory messages, whereby said ultimate selectible decision tree branch is dependent upon the responses to said primary and secondary interrogatory messages comprising said selectible decision tree.

13. A system in accordance with claim 1 wherein said telephone connection means comprises call forwarding means for enabling capture of a second telephone line in conjunction with said initial telephone line captured by said line capture and release means in response to detection of said arming signal.

14. A system in accordance with claim 13 wherein said arming signal comprises a prerecorded dialing code for enabling capture of said second telephone line.

15. A system in accordance with claim 14 wherein said telephone connection means comprises a plurality of selectible relay means each operatively connected to a different receiving telephone, said relay means enabling connection of a particular one of said receiving telephones to said captured telephone line in response to detection of a unique relay arming signal.

16. A system in accordance with claim 1 wherein said telephone connection means comprises a plurality of selectible relay means each operatively connected to a different receiving telephone, said relay means enabling connection of a particular one of said receiving telephones to said captured telephone line in response to detection of a unique, relay arming signal.

17. A system in accordance with claim 16 wherein said signal discriminator and track selection means comprises tone decoder means and means for converting the output of said tone decoder into a digital control signal for enabling said track selection.

18. A system in accordance with claim 17 wherein said converting means further comprises means for providing a digital control signal from a unique relay arming signal provided over said captured telephone line for enabling screenable connection of said captured telephone line to said particular one of said receiving telephones.

19. A method of providing an interactive tone responsive telephone answering multitrack storage medium comprising the steps of providing a multitrack continuous loop magnetic storage medium in a beginning position, recording a first plurality of time audio information segments each containing a complete reproducible audio message;

recycling the storage medium to said beginning position;

recording a second plurality of timed audio information segments on a plurality of coextensive audio tracks, each coextensive segment being related in content, spatially and in real time to the audio information segments on said first recorded audio track in a caller variable decision tree format having an ultimate branch and comprising a primary interrogatory message and a plurality of related derivative secondary interrogatory messages;

said derivative secondary interrogatory messages being chained linked in content to said primary interrogatory message for forming said caller selectible decision tree;

selecting one of said audio information segments as being the last audio information segment in said decision tree; and recording a ringing tone disposed after the completion of said selected recorded audio message segment on at least one of said tracks for enabling ring tone generation upon selective playback of said ultimate branch in said decision tree.

20. A method in accordance with claim 19 further comprising the step of recording an end of tape signal on said storage medium disposed after said ringing tone for enabling disabling of playback from said storage medium.

21. A method in accordance with claim 19 wherein said recycling step further comprises the step of recycling the storage medium to said beginning position prior to recording each successive coextensive audio track in said plurality.

22. A method in accordance with claim 19 further commprising the step of recording a call forwarding dialing code on one of said coextensive tracks for enabling call forwarding to a remote telephone.

* * * * *